US012701027B2

(12) United States Patent
Esswie

(10) Patent No.: US 12,701,027 B2
(45) Date of Patent: Aug. 4, 2026

(54) MULTICAST PAYLOAD DELIVERY TO IDLE MODE USER EQUIPMENT

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 391 days.

(21) Appl. No.: 18/339,985

(22) Filed: Jun. 22, 2023

(65) Prior Publication Data

US 2024/0430120 A1 Dec. 26, 2024

(51) Int. Cl.
H04L 12/18 (2006.01)
H04B 17/318 (2015.01)

(52) U.S. Cl.
CPC ......... H04L 12/189 (2013.01); H04B 17/318 (2015.01)

(58) Field of Classification Search
CPC . H04L 12/189; H04B 17/318; H04B 7/06952; H04B 7/0695; H04B 7/0408; H04W 72/30; H04W 72/046; H04W 4/06
See application file for complete search history.

(56) References Cited

U.S. PATENT DOCUMENTS

| | | | |
|---|---|---|---|
| 10,999,816 B2 | 5/2021 | Drevon et al. | |
| 2008/0045228 A1* | 2/2008 | Zhang | H04L 1/0026 455/450 |
| 2016/0242069 A1* | 8/2016 | Li | H04W 24/10 |
| 2018/0132284 A1 | 5/2018 | Oh | |

| | | | |
|---|---|---|---|
| 2018/0317200 A1 | 11/2018 | Kim et al. | |
| 2019/0182699 A1* | 6/2019 | Shrivastava | H04W 72/30 |
| 2021/0136532 A1* | 5/2021 | Liu | H04W 4/06 |
| 2021/0144516 A1* | 5/2021 | Kim | H04W 72/046 |
| 2022/0167301 A1 | 5/2022 | Goyal et al. | |
| 2022/0264517 A1 | 8/2022 | Liu et al. | |

(Continued)

FOREIGN PATENT DOCUMENTS

WO 2022/002830 1/2022

OTHER PUBLICATIONS

"5G NR—4G Lte related technology insights: Random Access" (https://info-nrlte.com/tag/preamble/#:~:text=During%20the% 20initial%20access%20to,DL%20transmissions%20to%20the% 20UE) (access Feb. 20, 2026) (Year: 2020).*

(Continued)

*Primary Examiner* — Andrew W Chriss
(74) *Attorney, Agent, or Firm* — Amin, Turocy & Watson, LLP

(57) ABSTRACT

A user equipment may be configured by a radio access network node via a multicast configuration with beam pattern information corresponding to downlink beams usable to receive multicast or broadcast content while the user equipment is idle. The user equipment may determine signal strength or error rate metrics. If a determined metric indicates violation of a configured criterion, the user equipment may transmit to the node a preamble contained in the multicast configuration. Based on the preamble, the node may update the beam pattern information, or the node may transmit a paging message comprising a preamble identifier corresponding to the preamble transmitted by the idle user equipment. The idle user equipment may determine, based on the preamble identifier in the paging message, to transition to connected mode to receive the content.

20 Claims, 18 Drawing Sheets

(56)         References Cited

U.S. PATENT DOCUMENTS

| | | | |
|---|---|---|---|
| 2023/0239661 A1 | 7/2023 | Van et al. | |
| 2023/0261729 A1* | 8/2023 | Huang ................. | H04B 7/0857 |
| | | | 375/267 |
| 2023/0300941 A1* | 9/2023 | Baek ................... | H04W 72/231 |

OTHER PUBLICATIONS

Esswie, Ali. "Preamble-Based Paging of Idle Mode User Equipment" U.S. Appl. No. 18/339,991, filed Jun. 22, 2023, 89 pages.
Invitation to Pay Additional Fees mailed Mar. 5, 2024 for PCT Application No. PCT/US2023/036200, 11 pages.
International Search Report and Written Opinion mailed May 8, 2024 for PCT Application No. PCT/US2023/036200, 19 pages.
Office Action mailed Jul. 3, 2025 for U.S. Appl. No. 18/339,991, 116 pages.
Notification Concerning Transmittal of International Preliminary Report on Patentability for PCT Application No. PCT/US2023/036200 mailed Jan. 2, 2026, 12 pages.
Notice of Allowance mailed Oct. 30, 2025 for U.S. Appl. No. 18/339,991, 55 pages.

* cited by examiner

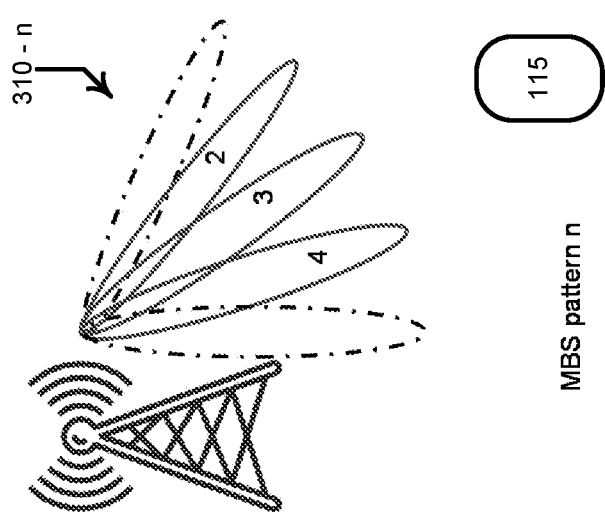
MBS pattern n
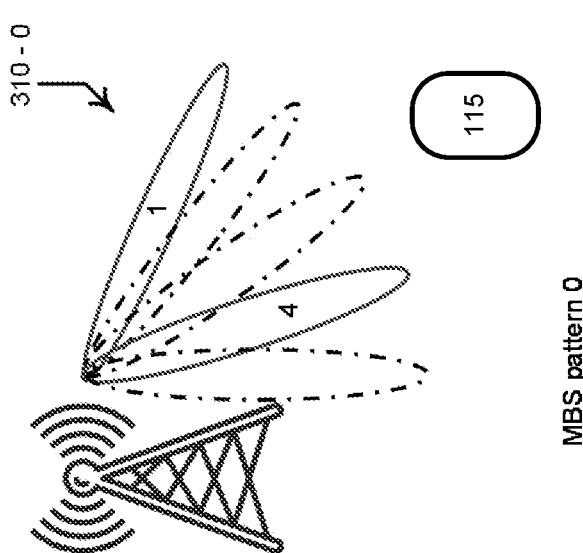
MBS pattern 0
FIG. 3

FIG. 6

Figure 8:
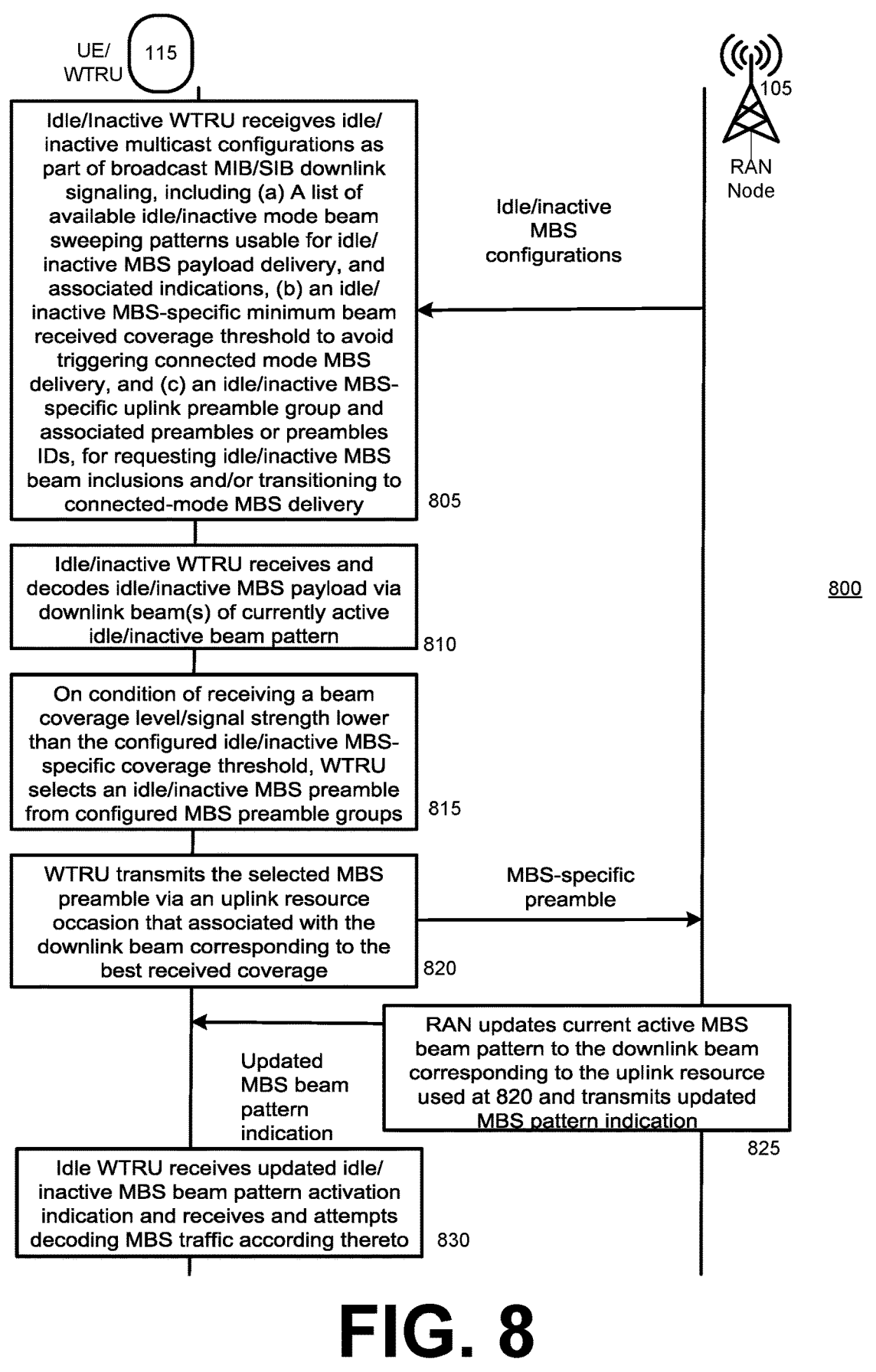

UE/
WTRU ( 115 )

((•)) 105

RAN
Node

| Idle/Inactive WTRU receigves idle/ inactive multicast configurations as part of broadcast MIB/SIB downlink signaling, including (a) A list of available idle/inactive mode beam sweeping patterns usable for idle/ inactive MBS payload delivery, and associated indications, (b) an idle/ inactive MBS-specific minimum beam received coverage threshold to avoid triggering connected mode MBS delivery, and (c) an idle/inactive MBS-specific uplink preamble group and associated preambles or preambles IDs, for requesting idle/inactive MBS beam inclusions and/or transitioning to connected-mode MBS delivery | 805 |

Idle/inactive
MBS
configurations

| Idle/inactive WTRU receives and decodes idle/inactive MBS payload via downlink beam(s) of currently active idle/inactive beam pattern | 810 |

| On condition of receiving a beam coverage level/signal strength lower than the configured idle/inactive MBS-specific coverage threshold, WTRU selects an idle/inactive MBS preamble from configured MBS preamble groups | 815 |

| WTRU transmits the selected MBS preamble via an uplink resource occasion that associated with the downlink beam corresponding to the best received coverage | 820 |

MBS-specific
preamble

800

| RAN updates current active MBS beam pattern to the downlink beam corresponding to the uplink resource used at 820 and transmits updated MBS pattern indication | 825 |

Updated
MBS beam
pattern
indication

| Idle WTRU receives updated idle/ inactive MBS beam pattern activation indication and receives and attempts decoding MBS traffic according thereto | 830 |

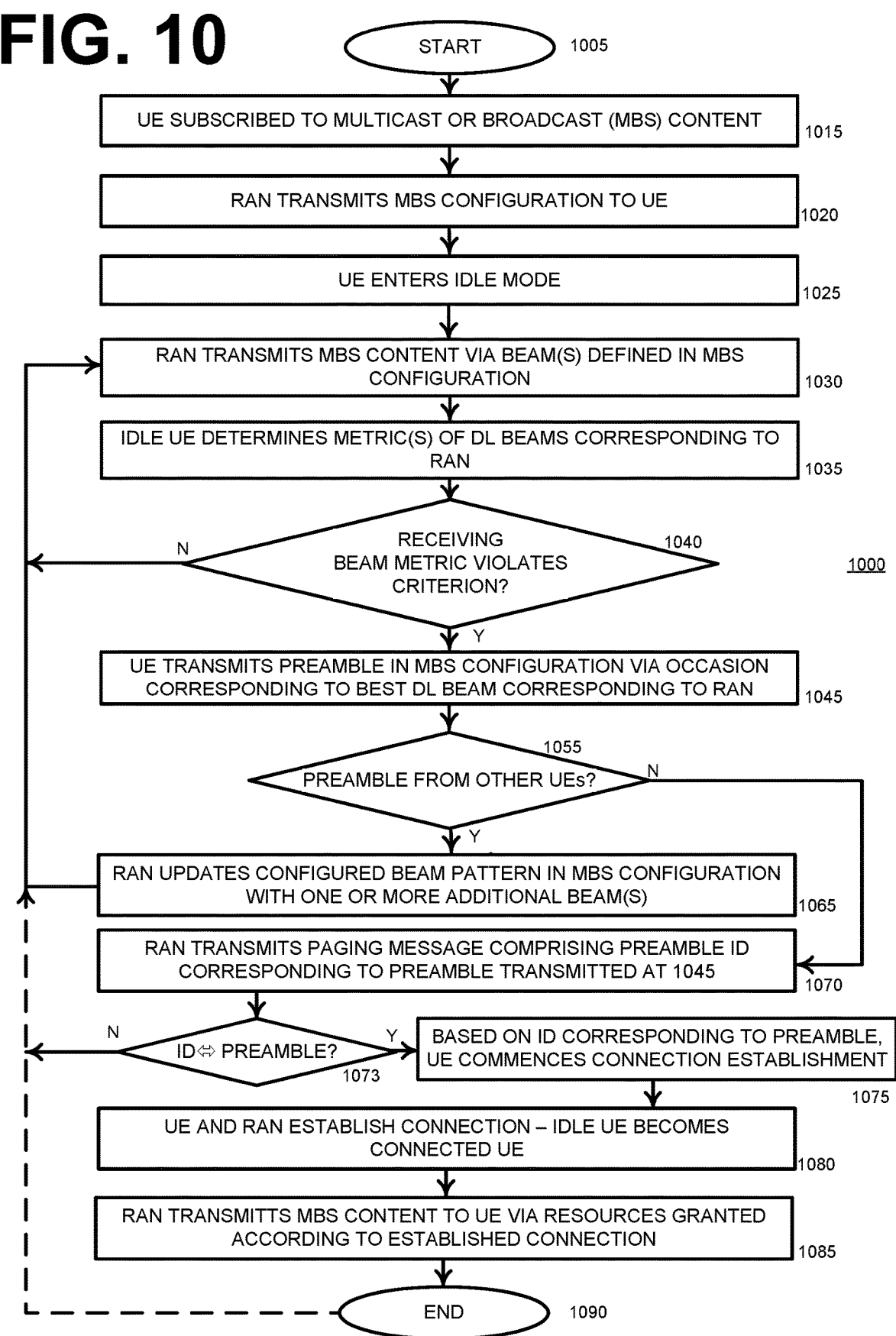

START 1005

UE SUBSCRIBED TO MULTICAST OR BROADCAST (MBS) CONTENT 1015

RAN TRANSMITS MBS CONFIGURATION TO UE 1020

UE ENTERS IDLE MODE 1025

RAN TRANSMITS MBS CONTENT VIA BEAM(S) DEFINED IN MBS CONFIGURATION 1030

IDLE UE DETERMINES METRIC(S) OF DL BEAMS CORRESPONDING TO RAN 1035

RECEIVING BEAM METRIC VIOLATES CRITERION? 1040    1000

N

Y

UE TRANSMITS PREAMBLE IN MBS CONFIGURATION VIA OCCASION CORRESPONDING TO BEST DL BEAM CORRESPONDING TO RAN 1045

PREAMBLE FROM OTHER UEs? 1055

N

Y

RAN UPDATES CONFIGURED BEAM PATTERN IN MBS CONFIGURATION WITH ONE OR MORE ADDITIONAL BEAM(S) 1065

RAN TRANSMITS PAGING MESSAGE COMPRISING PREAMBLE ID CORRESPONDING TO PREAMBLE TRANSMITTED AT 1045 1070

ID ⇔ PREAMBLE? 1073

N    Y

BASED ON ID CORRESPONDING TO PREAMBLE, UE COMMENCES CONNECTION ESTABLISHMENT 1075

UE AND RAN ESTABLISH CONNECTION – IDLE UE BECOMES CONNECTED UE 1080

RAN TRANSMITTS MBS CONTENT TO UE VIA RESOURCES GRANTED ACCORDING TO ESTABLISHED CONNECTION 1085

END 1090

Figure 11:
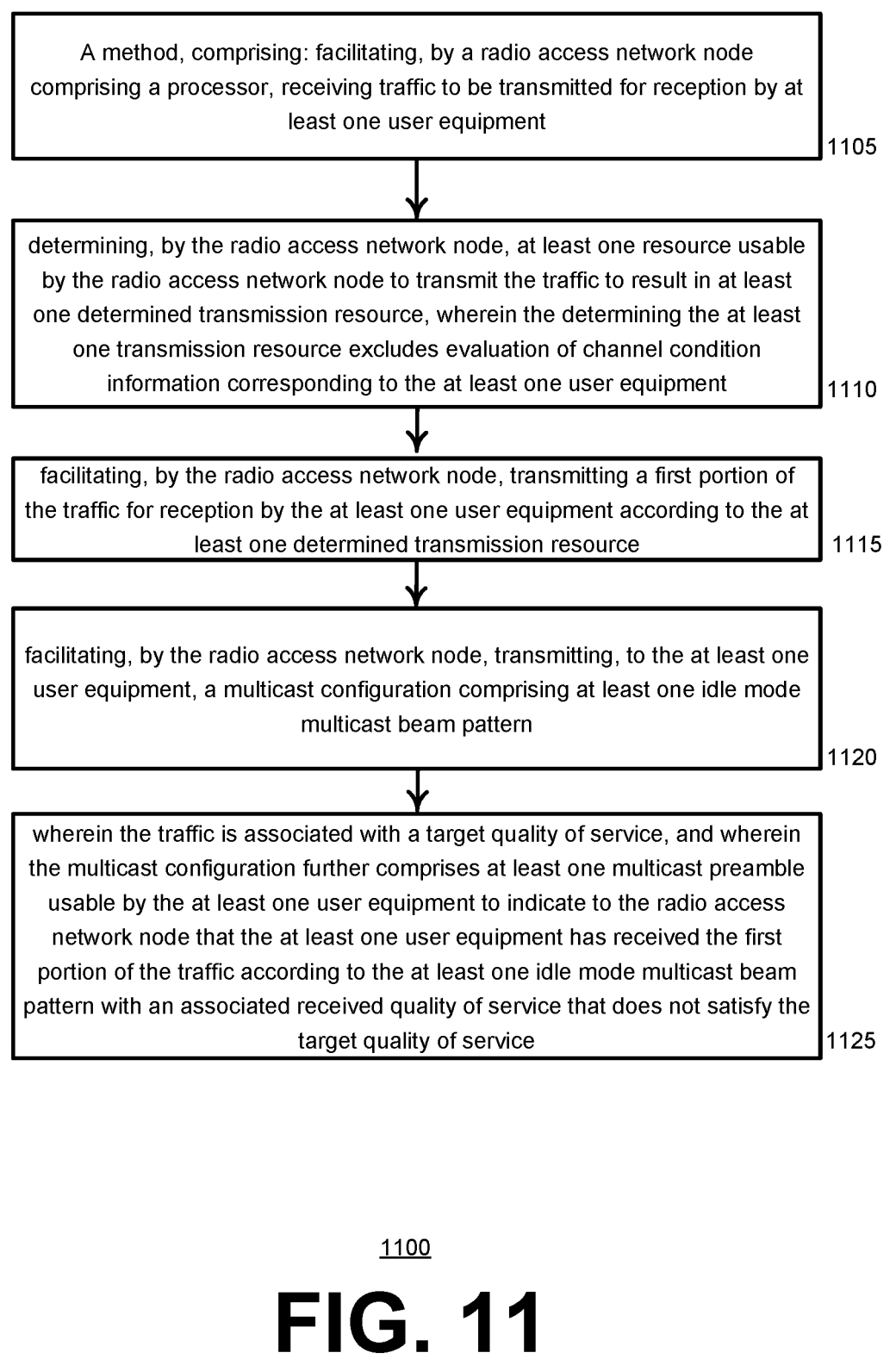

A method, comprising: facilitating, by a radio access network node comprising a processor, receiving traffic to be transmitted for reception by at least one user equipment

1105 determining, by the radio access network node, at least one resource usable by the radio access network node to transmit the traffic to result in at least one determined transmission resource, wherein the determining the at least one transmission resource excludes evaluation of channel condition information corresponding to the at least one user equipment

1110 facilitating, by the radio access network node, transmitting a first portion of the traffic for reception by the at least one user equipment according to the at least one determined transmission resource

1115 facilitating, by the radio access network node, transmitting, to the at least one user equipment, a multicast configuration comprising at least one idle mode multicast beam pattern

1120 wherein the traffic is associated with a target quality of service, and wherein the multicast configuration further comprises at least one multicast preamble usable by the at least one user equipment to indicate to the radio access network node that the at least one user equipment has received the first portion of the traffic according to the at least one idle mode multicast beam pattern with an associated received quality of service that does not satisfy the target quality of service

Figure 12:
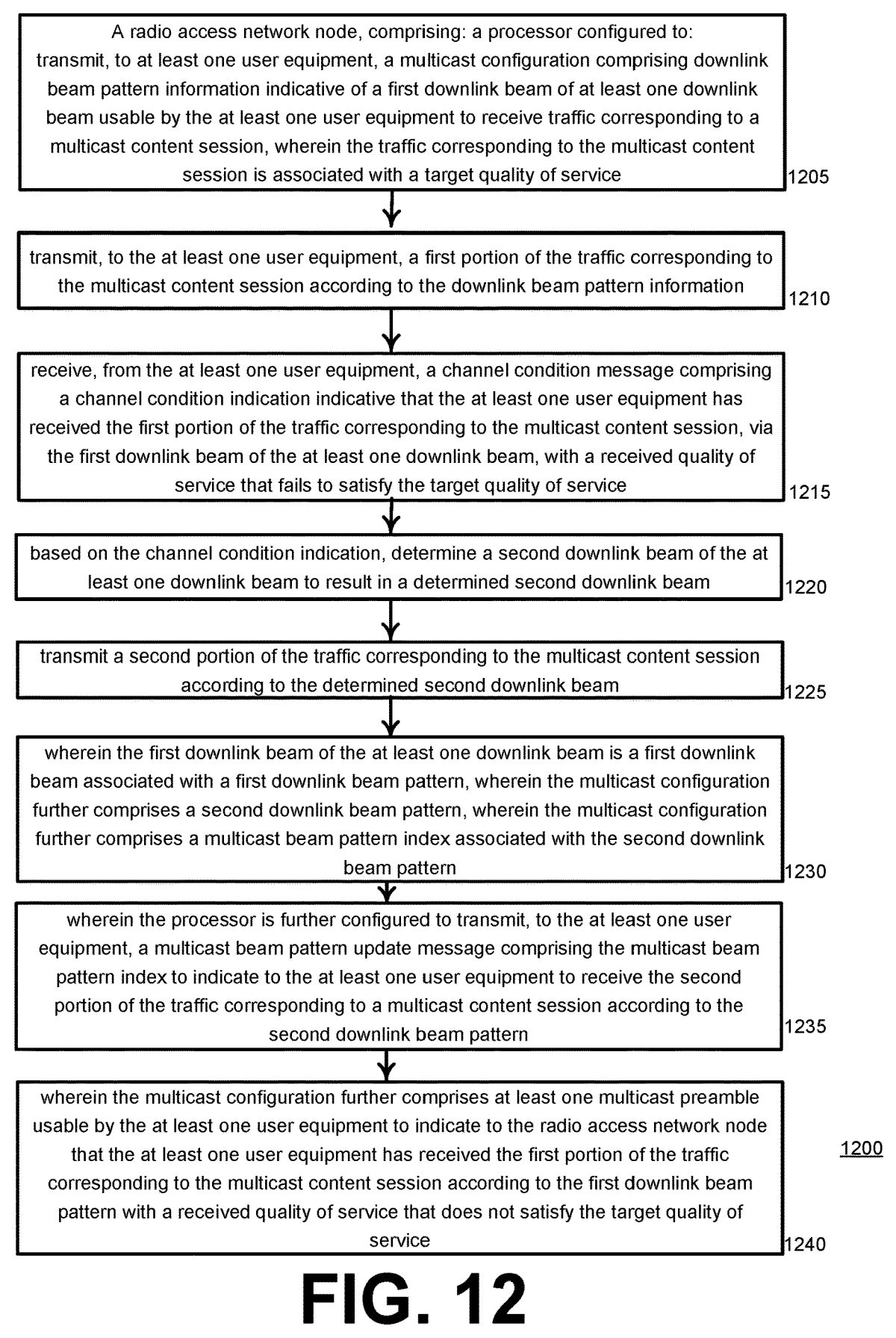

A radio access network node, comprising: a processor configured to:
transmit, to at least one user equipment, a multicast configuration comprising downlink beam pattern information indicative of a first downlink beam of at least one downlink beam usable by the at least one user equipment to receive traffic corresponding to a multicast content session, wherein the traffic corresponding to the multicast content session is associated with a target quality of service

1205 transmit, to the at least one user equipment, a first portion of the traffic corresponding to the multicast content session according to the downlink beam pattern information

1210 receive, from the at least one user equipment, a channel condition message comprising a channel condition indication indicative that the at least one user equipment has received the first portion of the traffic corresponding to the multicast content session, via the first downlink beam of the at least one downlink beam, with a received quality of service that fails to satisfy the target quality of service

1215 based on the channel condition indication, determine a second downlink beam of the at least one downlink beam to result in a determined second downlink beam

1220 transmit a second portion of the traffic corresponding to the multicast content session according to the determined second downlink beam

1225 wherein the first downlink beam of the at least one downlink beam is a first downlink beam associated with a first downlink beam pattern, wherein the multicast configuration further comprises a second downlink beam pattern, wherein the multicast configuration further comprises a multicast beam pattern index associated with the second downlink beam pattern

1230 wherein the processor is further configured to transmit, to the at least one user equipment, a multicast beam pattern update message comprising the multicast beam pattern index to indicate to the at least one user equipment to receive the second portion of the traffic corresponding to a multicast content session according to the second downlink beam pattern

1235 wherein the multicast configuration further comprises at least one multicast preamble usable by the at least one user equipment to indicate to the radio access network node that the at least one user equipment has received the first portion of the traffic corresponding to the multicast content session according to the first downlink beam pattern with a received quality of service that does not satisfy the target quality of service

Figure 13:
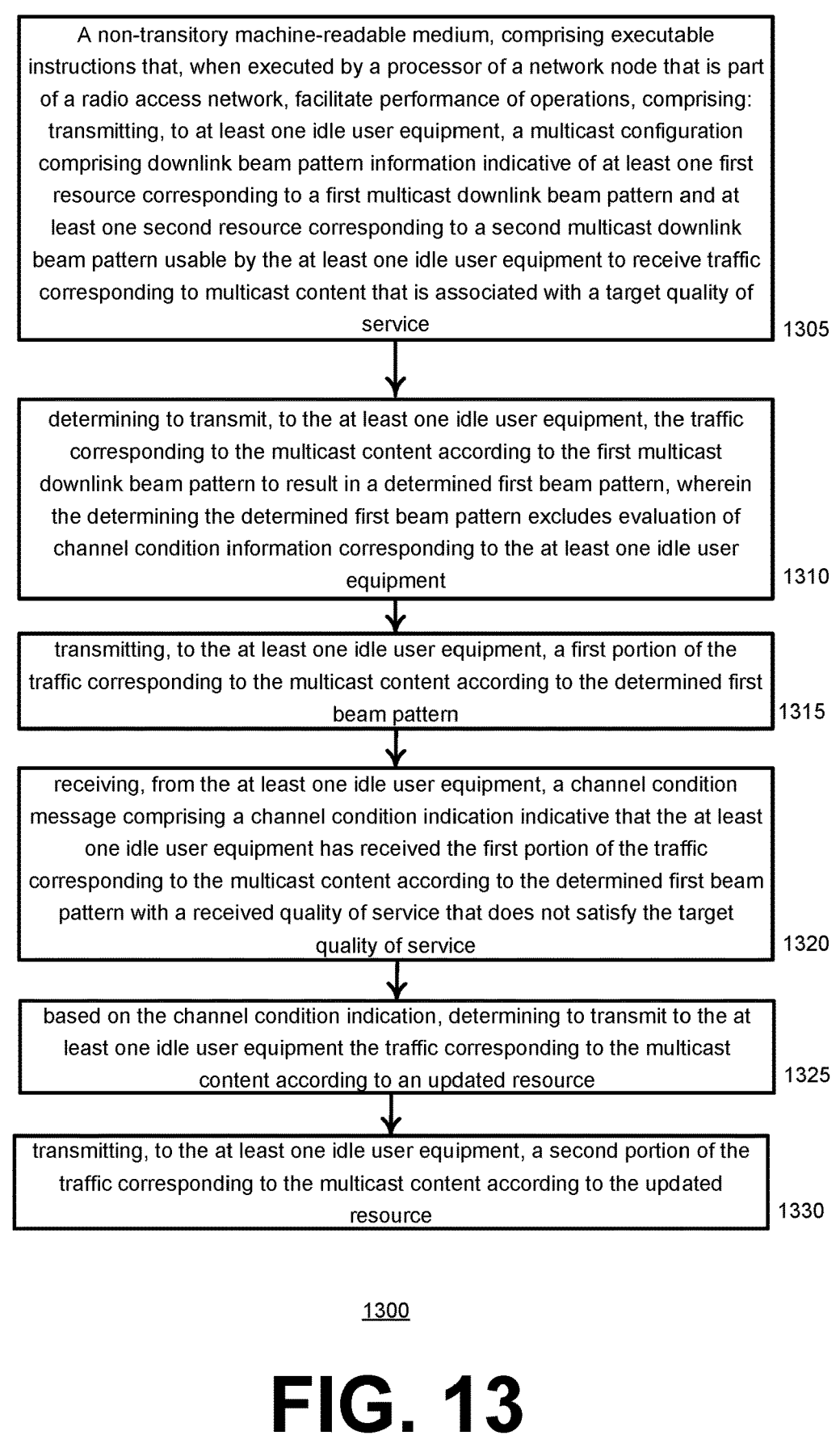

A non-transitory machine-readable medium, comprising executable instructions that, when executed by a processor of a network node that is part of a radio access network, facilitate performance of operations, comprising: transmitting, to at least one idle user equipment, a multicast configuration comprising downlink beam pattern information indicative of at least one first resource corresponding to a first multicast downlink beam pattern and at least one second resource corresponding to a second multicast downlink beam pattern usable by the at least one idle user equipment to receive traffic corresponding to multicast content that is associated with a target quality of service    1305 determining to transmit, to the at least one idle user equipment, the traffic corresponding to the multicast content according to the first multicast downlink beam pattern to result in a determined first beam pattern, wherein the determining the determined first beam pattern excludes evaluation of channel condition information corresponding to the at least one idle user equipment    1310 transmitting, to the at least one idle user equipment, a first portion of the traffic corresponding to the multicast content according to the determined first beam pattern    1315 receiving, from the at least one idle user equipment, a channel condition message comprising a channel condition indication indicative that the at least one idle user equipment has received the first portion of the traffic corresponding to the multicast content according to the determined first beam pattern with a received quality of service that does not satisfy the target quality of service    1320 based on the channel condition indication, determining to transmit to the at least one idle user equipment the traffic corresponding to the multicast content according to an updated resource    1325 transmitting, to the at least one idle user equipment, a second portion of the traffic corresponding to the multicast content according to the updated resource    1330

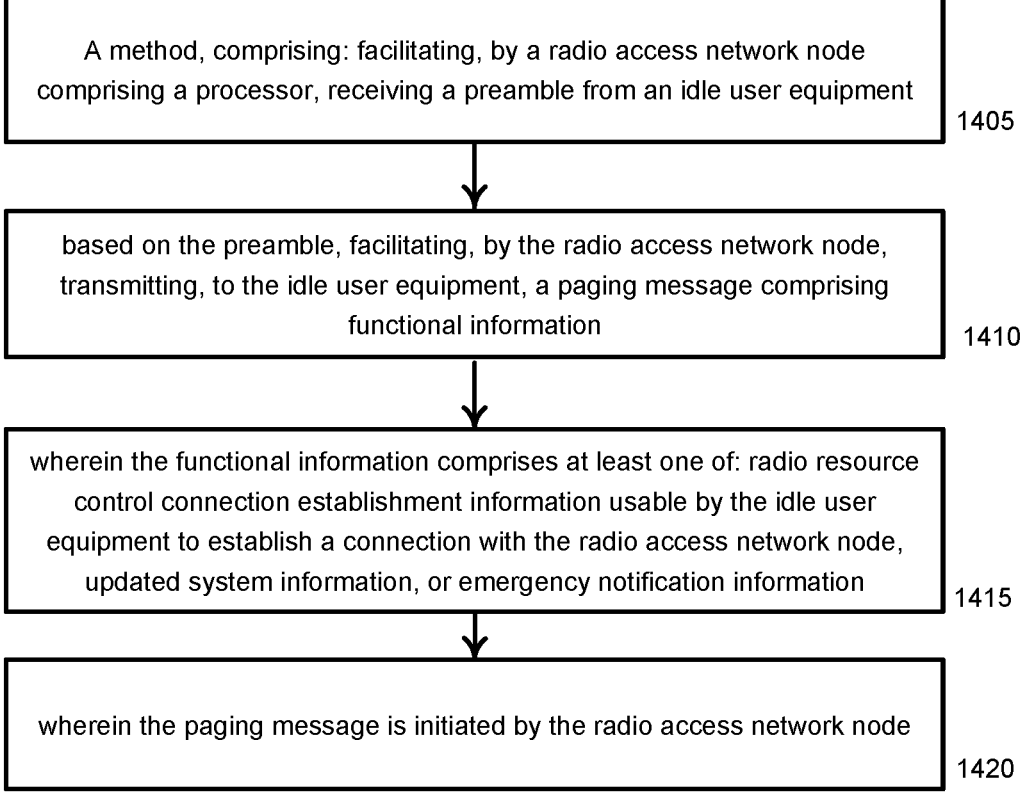

A method, comprising: facilitating, by a radio access network node comprising a processor, receiving a preamble from an idle user equipment

1405 based on the preamble, facilitating, by the radio access network node, transmitting, to the idle user equipment, a paging message comprising functional information

1410 wherein the functional information comprises at least one of: radio resource control connection establishment information usable by the idle user equipment to establish a connection with the radio access network node, updated system information, or emergency notification information

1415 wherein the paging message is initiated by the radio access network node

Figure 15:
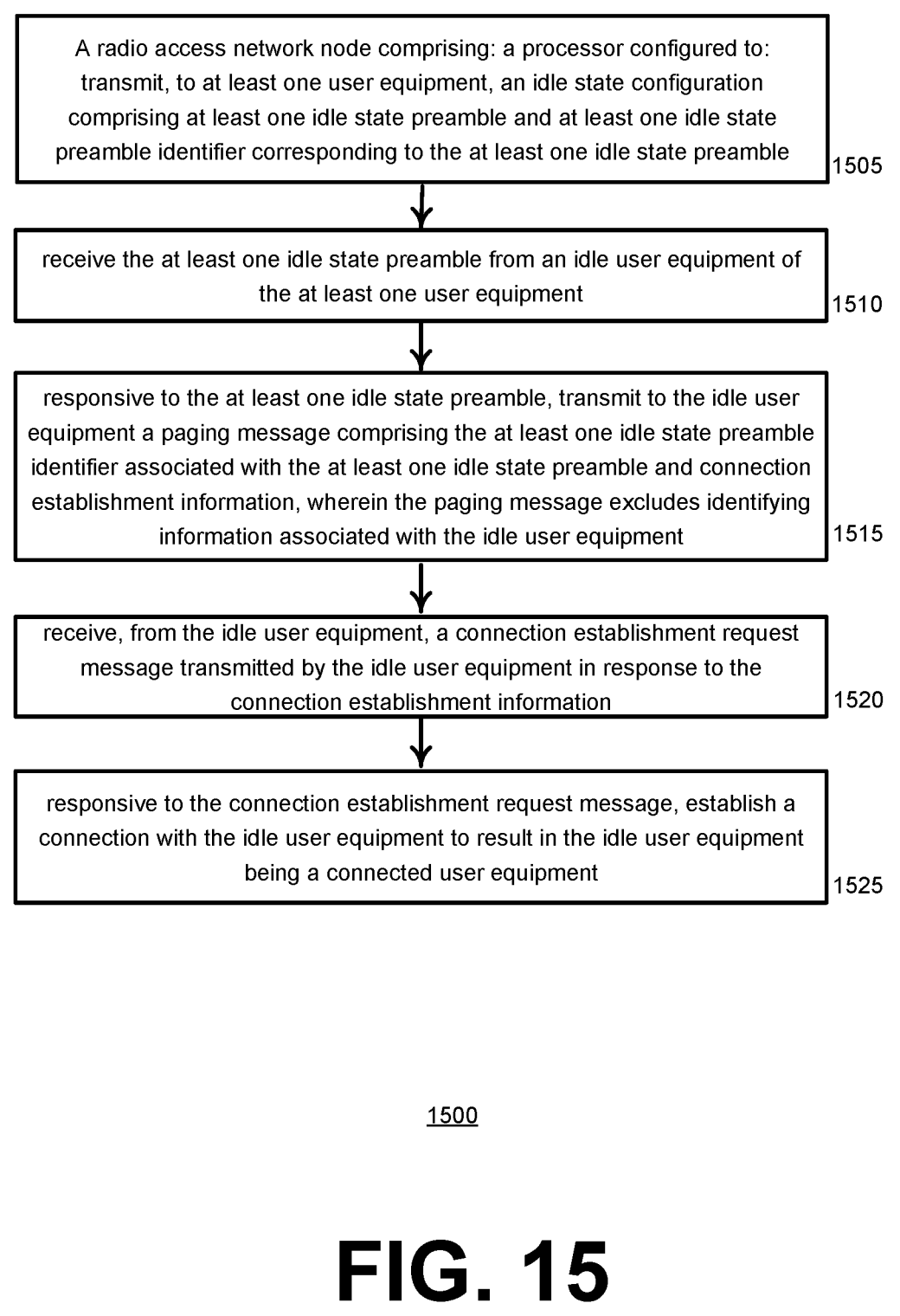

A radio access network node comprising: a processor configured to: transmit, to at least one user equipment, an idle state configuration comprising at least one idle state preamble and at least one idle state preamble identifier corresponding to the at least one idle state preamble

1505

↓ receive the at least one idle state preamble from an idle user equipment of the at least one user equipment

1510

↓ responsive to the at least one idle state preamble, transmit to the idle user equipment a paging message comprising the at least one idle state preamble identifier associated with the at least one idle state preamble and connection establishment information, wherein the paging message excludes identifying information associated with the idle user equipment

1515

↓ receive, from the idle user equipment, a connection establishment request message transmitted by the idle user equipment in response to the connection establishment information

1520

↓ responsive to the connection establishment request message, establish a connection with the idle user equipment to result in the idle user equipment being a connected user equipment

Figure 16:
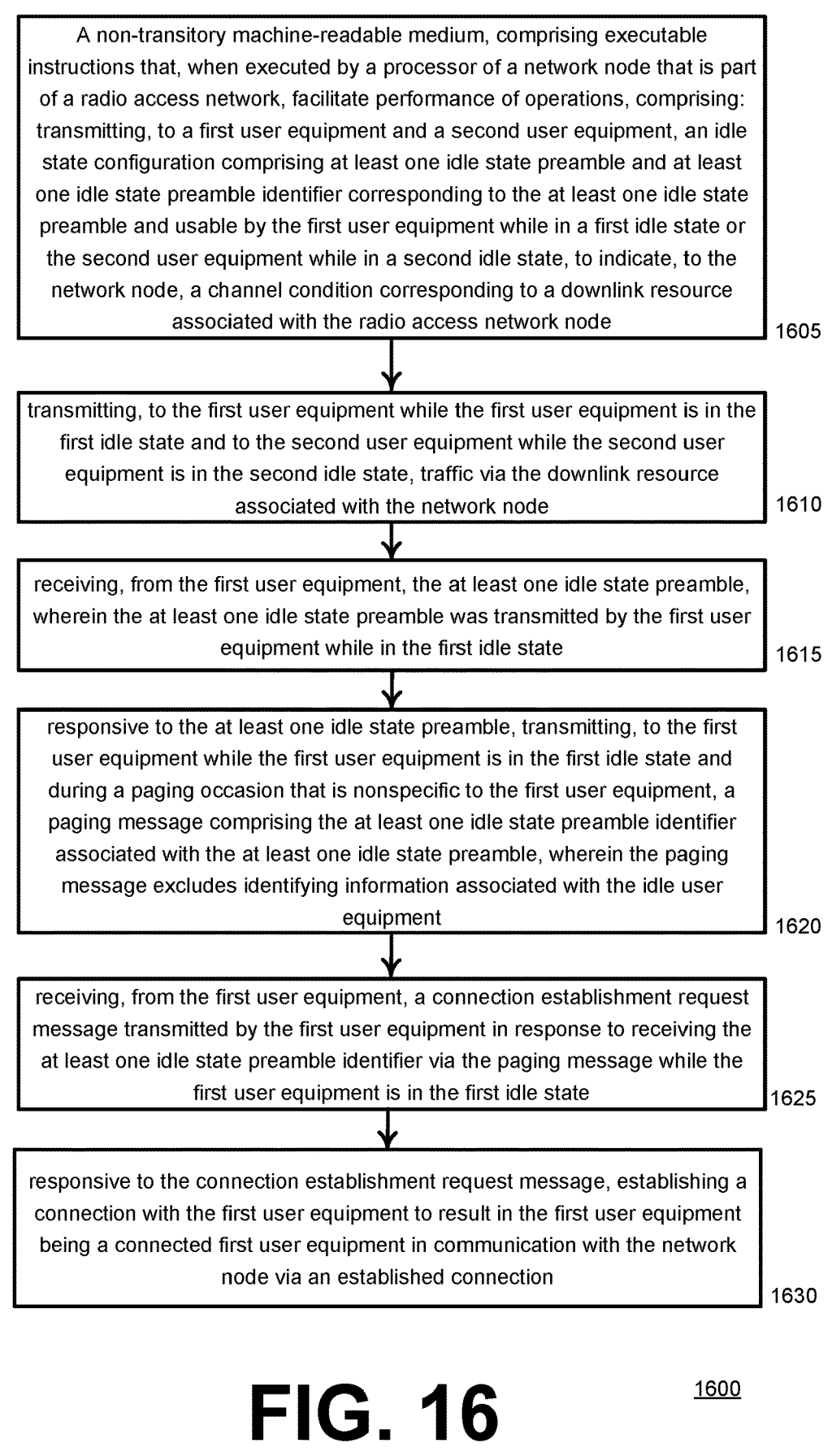

A non-transitory machine-readable medium, comprising executable instructions that, when executed by a processor of a network node that is part of a radio access network, facilitate performance of operations, comprising: transmitting, to a first user equipment and a second user equipment, an idle state configuration comprising at least one idle state preamble and at least one idle state preamble identifier corresponding to the at least one idle state preamble and usable by the first user equipment while in a first idle state or the second user equipment while in a second idle state, to indicate, to the network node, a channel condition corresponding to a downlink resource associated with the radio access network node     1605 transmitting, to the first user equipment while the first user equipment is in the first idle state and to the second user equipment while the second user equipment is in the second idle state, traffic via the downlink resource associated with the network node     1610 receiving, from the first user equipment, the at least one idle state preamble, wherein the at least one idle state preamble was transmitted by the first user equipment while in the first idle state     1615 responsive to the at least one idle state preamble, transmitting, to the first user equipment while the first user equipment is in the first idle state and during a paging occasion that is nonspecific to the first user equipment, a paging message comprising the at least one idle state preamble identifier associated with the at least one idle state preamble, wherein the paging message excludes identifying information associated with the idle user equipment     1620 receiving, from the first user equipment, a connection establishment request message transmitted by the first user equipment in response to receiving the at least one idle state preamble identifier via the paging message while the first user equipment is in the first idle state     1625 responsive to the connection establishment request message, establishing a connection with the first user equipment to result in the first user equipment being a connected first user equipment in communication with the network node via an established connection     1630

FIG. 16     1600

MULTICAST PAYLOAD DELIVERY TO IDLE MODE USER EQUIPMENT

CROSS REFERENCE TO RELATED APPLICATION

The subject patent application is related by subject matter to, U.S. patent application Ser. No. 18/339,991, filed Jun. 22, 2023, and entitled "Preamble-based paging of idle mode user equipment," the entirety of which application is hereby incorporated by reference herein.

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, receiving traffic to be transmitted for reception by at least one user equipment. The method may further comprise determining, by the radio access network node, at least one resource usable by the radio access network node to transmit the traffic to result in at least one determined transmission resource, wherein the determining the at least one transmission resource excludes evaluation of channel condition information corresponding to the at least one user equipment, and facilitating, by the radio access network node, transmitting a first portion of the traffic for reception by the at least one user equipment according to the at least one determined transmission resource. The at least one user equipment may be operating in, or according to, an idle mode. The method may further comprise facilitating, by the radio access network node, transmitting, to the at least one user equipment, a multicast configuration comprising at least one idle mode multicast beam pattern. In an embodiment, the multicast configuration may be transmitted to the at least one user equipment via a multicast-specific system information block message. In an embodiment, the at least one determined transmission resource corresponds to the at least one idle mode multicast beam pattern.

In an embodiment, the at least one idle mode multicast beam pattern may be a first idle mode multicast beam pattern, and the traffic may be associated with a target quality of service. The method may further comprise facilitating, by the radio access network node, receiving, from the at least one user equipment, a channel condition message comprising a channel condition indication indicative that the at least one user equipment received the first portion of the traffic according to the at least one idle mode multicast beam pattern with an associated received quality of service that does not satisfy the target quality of service. Based on the channel condition indication, the method may further comprise facilitating, by the radio access network node, determining a second idle mode multicast beam pattern of the at least one idle mode multicast beam pattern to result in a determined second idle mode multicast beam pattern, and facilitating, by the radio access network node, transmitting a second portion of the traffic according to the determined second idle mode multicast beam pattern. The first portion of the traffic may comprise one or more traffic packets of the multicast content that not received according to a Quality of service associated with the content and the second portion of the traffic may comprise one or more traffic packets that are transmitted according to a new beam pattern.

In an embodiment, the target quality of service may be a target error rate. The received quality of service may be a received error rate corresponding to reception of the first portion of the traffic by the at least one user equipment, and wherein the received error rate is higher than the target error rate.

In an embodiment, the at least one idle mode multicast beam pattern may a first idle mode multicast beam pattern. The multicast configuration may further comprise a second idle mode multicast beam pattern of the at least one idle mode multicast beam pattern. The multicast configuration may further comprise a multicast beam pattern index associated with the second idle mode multicast beam pattern. The method may further comprise facilitating, by the radio access network node, transmitting, to the at least one user equipment, a multicast beam pattern update message, comprising the multicast beam pattern index associated with the second idle mode multicast beam pattern, to indicate to the at least one user equipment to receive a second portion of the traffic according to the second idle mode multicast beam pattern. The multicast beam pattern update message is transmitted via a master information block message.

In an embodiment, the traffic may be associated with a target quality of service. The multicast configuration may further comprise at least one multicast preamble usable by the at least one user equipment to indicate to the radio access network node that the at least one user equipment has received a first portion of the traffic according to the at least one idle mode multicast beam pattern with an associated received quality of service that does not satisfy the target quality of service. The method may further comprise facilitating, by the radio access network node, receiving, from the at least one user equipment, the at least one multicast preamble via an uplink resource associated with a downlink beam. Based on the at least one multicast preamble being received by the radio access network node via an uplink resource associated with the downlink beam, the method may further comprise determining, by the radio access network node, that the at least one user equipment has determined that the downlink beam corresponds to a signal strength that is stronger, with respect to the at least one user equipment, than other signal strengths corresponding to other downlink beams corresponding to the radio access network node to result in a determined best downlink beam. The method may further comprise facilitating, by the radio access network node, transmitting, to the at least one user equipment, a paging message comprising a connected mode indication to indicate to the at least one user equipment to establish a connection with the radio access network node to receive the traffic in a connected mode.

The at least one idle mode multicast beam pattern may be a first idle mode multicast beam pattern and the method may further comprise facilitating, by the radio access network node, receiving, from the at least one user equipment, the at least one multicast preamble via an uplink resource associated with a downlink beam. The method may further comprise, based on the at least one multicast preamble being received by the radio access network node via an uplink resource associated with the downlink beam, determining, by the radio access network node, that the at least one user equipment has determined that the downlink beam corresponds to a signal strength that is stronger, with respect to the at least one user equipment, than other signal strengths corresponding to other downlink beams corresponding to the radio access network node to result in a determined best downlink beam. The method may further comprise, determining, by the radio access network node, a second idle mode multicast beam pattern, of the at least one idle mode multicast beam pattern, that comprises the determined best downlink beam to result in a determined second idle mode multicast beam pattern. The method may further comprise, facilitating, by the radio access network node, transmitting, to the at least one user equipment, a multicast beam pattern update message indicative to the at least one user equipment to receive the traffic according to the determined second idle mode multicast beam pattern, and facilitating, by the radio access network node, transmitting the traffic according to the determined second idle mode multicast beam pattern.

In another example embodiment, a radio access network node may comprise a processor configured to transmit, to at least one user equipment, a multicast configuration comprising downlink beam pattern information indicative of a first downlink beam of at least one downlink beam usable by the at least one user equipment to receive traffic corresponding to a multicast content session, wherein the traffic corresponding to the multicast content session is associated with a target quality of service. The processor may be further configured to transmit, to the at least one user equipment, a first portion of the traffic corresponding to the multicast content session according to the downlink beam pattern information, and the processor may be further configured to receive, from the at least one user equipment, a channel condition message comprising a channel condition indication indicative that the at least one user equipment has received the first portion of the traffic corresponding to the multicast content session, via the first downlink beam of the at least one downlink beam, with a received quality of service that fails to satisfy the target quality of service. Based on the channel condition indication, the processor may be further configured to determine a second downlink beam of the at least one downlink beam to result in a determined second downlink beam, and to transmit a second portion of the traffic corresponding to the multicast content session according to the determined second downlink beam.

In an embodiment, the first downlink beam of the at least one downlink beam may be a first downlink beam associated with a first downlink beam pattern. The multicast configuration may further comprise a second downlink beam pattern, and the multicast configuration further comprises a multicast beam pattern index associated with the second downlink beam pattern, and wherein the processor is further configured to. The processor may be further configured to transmit, to the at least one user equipment, a multicast beam pattern update message comprising the multicast beam pattern index to indicate to the at least one user equipment to receive the second portion of the traffic corresponding to a multicast content session according to the second downlink beam pattern.

In an embodiment, the multicast configuration may further comprise at least one multicast preamble usable by the at least one user equipment to indicate to the radio access network node that the at least one user equipment has received the first portion of the traffic corresponding to the multicast content session according to the first downlink beam pattern with a received quality of service that does not satisfy the target quality of service.

In an embodiment, the determining the second downlink beam is based on the channel condition indication being received by the radio access network node via an uplink resource associated with the second downlink beam. The processor may be further configured to determine that the at least one user equipment determined that the determined second downlink beam corresponds to a signal strength that is stronger, with respect to the at least one user equipment, than other signal strengths associated with other downlink beams corresponding to the radio access network node to result in a determined best downlink beam, and to determine an idle mode multicast beam pattern that comprises the determined best downlink beam to result in a determined idle mode multicast beam pattern. The processor may be further configured to transmit, to the at least one user equipment, a multicast beam pattern update message indicative to the at least one user equipment to receive the traffic corresponding to the multicast content session according to the determined idle mode multicast beam pattern, wherein the determined idle mode multicast beam pattern comprises the determined second downlink beam.

In yet another example embodiment, a non-transitory machine-readable medium may comprise executable instructions that, when executed by a processor of a network node that is part of a radio access network, facilitate performance of operations, comprising transmitting, to at least one idle user equipment, a multicast configuration comprising downlink beam pattern information indicative of at least one first resource corresponding to a first multicast downlink beam pattern and at least one second resource corresponding to a second multicast downlink beam pattern usable by the at least one idle user equipment to receive traffic corresponding to multicast content that is associated with a target quality of service. The operations may further comprise determining to transmit, to the at least one idle user equipment, the traffic corresponding to the multicast content according to the first multicast downlink beam pattern to result in a determined first beam pattern, wherein the determining the determined first beam pattern excludes evaluation of channel condition information corresponding to the at least one idle user equipment. The operations may further comprise transmitting, to the at least one idle user equipment, a first portion of the traffic corresponding to the multicast content according to the determined first beam pattern, and receiving, from the at least one idle user equipment, a channel condition message comprising a channel condition indication indicative that the at least one idle user equipment has received the first portion of the traffic corresponding to the multicast content according to the determined first beam pattern with a received quality of service that does not satisfy the target quality of service. Based on the channel condition indication, the operations may further comprise determining to transmit to the at least one idle user equipment the traffic corresponding to the multicast content according to an updated resource, and transmitting, to the at least one idle user equipment, a second portion of the traffic corresponding to the multicast content according to the updated resource. The updated resource may comprise the at least one second resource corresponding to the second multicast downlink beam pattern.

In an embodiment, the multicast configuration may comprise at least one multicast preamble usable by the at least one idle user equipment to indicate to the radio access network node that the first portion of the traffic corresponding to the multicast content was received with the received quality of service that does not satisfy the target quality of service. Based on the at least one multicast preamble being received by the radio access network node via an uplink resource associated with an unspecified downlink beam that is not indicated in the downlink beam pattern information, the operations may further comprise determining that the at least one idle user equipment determined that the unspecified downlink beam corresponds to a signal strength that is stronger, with respect to the at least one idle user equipment, than other signal strengths corresponding to other downlink beams specified by the downlink beam pattern information, and transmitting, to the at least one idle user equipment, a paging message comprising a connected mode indication to indicate to the at least one idle user equipment to establish a connection with the radio access network node to receive the traffic corresponding to the multicast content in a connected mode.

In an embodiment, the operations may further comprise establishing, with the at least one idle user equipment, a communication session to result in the at least one idle user equipment being a connected user equipment, scheduling the updated resource to be usable by the at least one user equipment to receive the second portion of the traffic corresponding to the multicast content to result in a scheduled resource, and transmitting, to the connected user equipment, a scheduling message indicating the scheduled resource.

In another example embodiment, a method may comprise facilitating, by a radio access network node comprising a processor, receiving a preamble from an idle user equipment, and based on the preamble, facilitating, by the radio access network node, transmitting, to the idle user equipment, a paging message comprising functional information. The paging message may exclude identification information that uniquely corresponds to the idle user equipment. The idle mode user equipment may monitor and receive the paging message according to a configured paging resource usable to receive pacing messages that do not include an identifier associated with the user equipment. The radio access network node may transmit the paging message via a broadcast message. The preamble may be transmitted via a configured small data transmission uplink resource. The preamble may not be unique to the idle user equipment and may be usable in connection with other user equipment other than the idle user equipment.

The functional information may comprise at least one of: radio resource control connection establishment information usable by the idle user equipment to establish a connection with the radio access network node, updated system information, or emergency notification information.

The functional information may comprise the radio resource control connection establishment information and may be usable by the idle user equipment to establish a connection with the radio access network node. The method may further comprise, based on the radio resource control connection establishment information, facilitating, by the radio access network node, establishing a connection with the idle user equipment to result in the idle user equipment being a connected user equipment, and scheduling, by the radio access network node, at least one resource corresponding to the connection usable to communicate traffic with the connected user equipment to result in a scheduled resource. The method may further comprise facilitating, by the radio access network node, communicating the traffic with the connected user equipment via the scheduled resource.

In an embodiment, the functional information may comprise a connection establishment indication indicative to the idle user equipment to initiate a connection establishment procedure with respect to the radio access network node. The connection establishment indication may comprise a preamble identifier, corresponding to the preamble, indicative to the idle user equipment to initiate the connection establishment procedure with respect to the radio access network node based on the idle user equipment having transmitted the preamble.

In an embodiment, the paging message may be initiated by the radio access network node. Transmitting of the paging message may be initiated by the radio access network node without the radio access network node receiving a request to initiate the paging message, for example, without receiving a paging message request from a core network entity or from a neighboring radio access network node.

In another embodiment, a radio access network node may comprise a processor configured to transmit, to at least one user equipment, an idle state configuration comprising at least one idle state preamble and at least one idle state preamble identifier corresponding to the at least one idle state preamble. The processor may be further configured to receive the at least one idle state preamble from an idle user equipment of the at least one user equipment. Responsive to the at least one idle state preamble, the processor may be further configured to transmit to the idle user equipment a paging message comprising the at least one idle state preamble identifier associated with the at least one idle state preamble and connection establishment information, wherein the paging message excludes identifying information associated with the idle user equipment. The processor may be further configured to receive, from the idle user equipment, a connection establishment request message transmitted by the idle user equipment in response to the connection establishment information, and, responsive to the connection establishment request message, establish a connection with the idle user equipment to result in the idle user equipment being a connected user equipment.

In an embodiment, the downlink traffic payload may correspond to multicast content associated with a multicast content communication session having a target quality of service. The at least one idle state preamble may have been transmitted by the idle user equipment based on the idle user equipment receiving the multicast content, via a multicast transmission from the radio access network node, with a received quality of service that fails to satisfy the target quality of service.

In an embodiment, the idle user equipment may have transmitted the at least one idle state preamble via the uplink beam based on the downlink beam being determined by the idle user equipment as being a best serving beam, with respect to the radio access network node, of at least one downlink beam corresponding to the radio access network node.

In an embodiment, the at least one idle state preamble may be transmitted by the idle user equipment via a small data transmission uplink control channel resource.

In another example embodiment, a non-transitory machine-readable medium may comprise executable instructions that, when executed by a processor of a network node that is part of a radio access network, facilitate performance of operations, comprising transmitting, to a first user equipment and a second user equipment, an idle state configuration comprising at least one idle state preamble and at least one idle state preamble identifier corresponding to the at least one idle state preamble and usable by the first user equipment while in a first idle state or the second user equipment while in a second idle state, to indicate, to the network node, a channel condition corresponding to a downlink resource associated with the radio access network node. The idle state configuration may be a multicast configuration, but may not necessarily be a multicast configuration. The operations may further comprise transmitting, to the first user equipment while the first user equipment is in the first idle state and to the second user equipment while the second user equipment is in the second idle state, traffic via the downlink resource associated with the network node. The operations may further comprise receiving, from the first user equipment, the at least one idle state preamble, wherein the at least one idle state preamble was transmitted by the first user equipment while in the first idle state. Responsive to the at least one idle state preamble, the operations may further comprise transmitting, to the first user equipment while the first user equipment is in the first idle state and during a paging occasion that is nonspecific to the first user equipment, a paging message comprising the at least one idle state preamble identifier associated with the at least one idle state preamble, wherein the paging message excludes identifying information associated with the idle user equipment. The operations may further comprise receiving, from the first user equipment, a connection establishment request message transmitted by the first user equipment in response to receiving the at least one idle state preamble identifier via the paging message while the first user equipment is in the first idle state, and responsive to the connection establishment request message, establishing a connection with the first user equipment to result in the first user equipment being a connected first user equipment in communication with the network node via an established connection.

In an embodiment, the traffic may be first traffic, and the operations may further comprise transmitting, to the connected first user equipment via the established connection, second traffic corresponding to the multicast content session via the established connection.

In an embodiment, the paging message may be transmitted via a broadcast paging record signal message.

In an embodiment, the at least one idle state preamble may be received from the first user equipment via a configured small data transmission control channel resource.

In an embodiment, the first user equipment is a machine-to-machine user equipment.

BRIEF DESCRIPTION OF THE DRAWINGS

FIG. 3 illustrates multiple multicast beam patterns to transmit multicast content to idle state user equipment.

FIG. 6 illustrates an example environment with an idle state user equipment transmitting a multicast preamble via a best serving beam.

FIG. 8 illustrates a timing diagram of an example method to update an idle state user equipment with an updated multicast beam pattern.

FIG. 10 illustrates a flow diagram of an example method to deliver multicast traffic to idle state user equipment.

FIG. 11 illustrates a block diagram of an example method.

FIG. 12 illustrates a block diagram of an example network node.

FIG. 13 illustrates a block diagram of an example non-transitory machine-readable medium.

FIG. 14 illustrates a block diagram of an example method.

FIG. 15 illustrates a block diagram of an example radio access network node.

FIG. 16 illustrates a block diagram of an example non-transitory machine-readable medium.

DETAILED DESCRIPTION OF THE DRAWINGS

Figure 1:
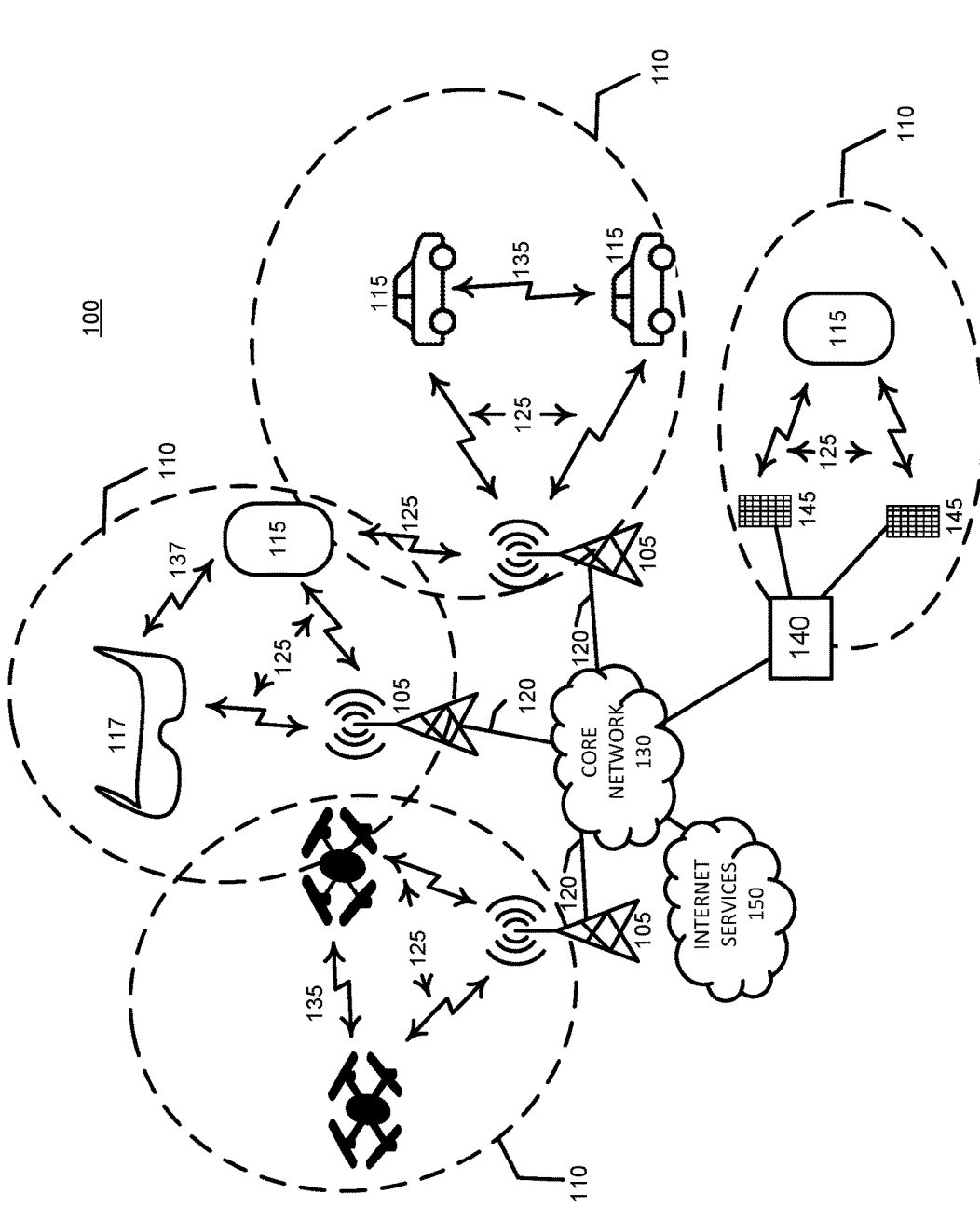
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions As disclosed herein, several embodiments facilitate dynamic management and updating of various AI/ML models deployed at different user equipment devices. A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2. Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier.

One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases. D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol UP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that mutes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz, also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A feature of 5G is the ability to support multicast and broadcast services ("MBS"), which allow for efficient delivery of multimedia content to a large number of users simultaneously. A reference herein to 'multicast' may be a reference to MBS. MBS content may be transmitted to user equipment that may have subscribed to receive the MBS content. MBS content may be broadcast to all user equipment within range of a RAN when a subscription is not required to receive the content, for example, to receive emergency information or alerts. Multicast broadcast services may comprise the capability of 5G networks to transmit data packets from a single source to multiple destinations according a point-to-multipoint ("P2MP") communication model. This is in contrast to unicast services with traffic data packets being sent from a single source to a single destination in a point-to-point ("P2P") communication model. With 5G MBS, a single copy of the multimedia content can be sent to multiple users, thus reducing transmission of duplicate data and optimizing network resources.

5G MBS may lead to communication improvements in various industries, including media and entertainment, public safety, transportation, and industrial automation. In the media and entertainment industry, for example, 5G MBS can enable the delivery of high-quality video and audio content to a large number of users simultaneously, such as live sports events or concerts. This can provide an immersive and engaging experience to users, thus opening up new opportunities for content providers and advertisers.

In the public safety sector, 5G MBS can be utilized for emergency communication and broadcasting critical information to first responders and the general public during disasters or emergencies. This can facilitate timely and efficient dissemination of important information, helping to save lives and minimize damages. In the transportation industry, 5G MBS can enable reliable and low-latency communication for connected vehicles, allowing for real-time traffic management, vehicle-to-vehicle ("V2V") communication, and vehicle-to-infrastructure ("V2I") communication. This can enhance road safety, traffic efficiency, and enable autonomous driving capabilities. With respect to industrial automation, 5G MBS can support remote monitoring, control, and management of industrial processes, enabling real-time data collection, analysis, and decisionmaking. This can improve operational efficiency, reduce equipment downtime, and facilitate new business models in the industrial sector.

Using conventional techniques, delivering a significant amount of MBS data volume to a large number of user equipment requires that the user equipment be connected to a RAN node to receive the MBS payload. Thus, for each user equipment, separate independent connection establishment signaling, control channel search space, and scheduling grants are established. Such separate resource scheduling and signaling may result in a large signaling overhead for a large number of MBS devices, which may lead to poor overall network spectral efficiency.

Conventional 5G techniques facilitate delivering MBS traffic to idle mode user equipment to avoid associated signaling overhead but without support for delivering MBS content according to a specified Quality of Service corresponding to the content. Since a RAN node does not have location and identification information available relative to idle user equipment, the RAN cannot efficiently determine serving downlink beams to use to transmit MBS content to idle user equipment, channel conditions, and mobility state of the idle mode devices since idle user equipment are not connected to the RAN. Thus, QoS targets with respect to MBS payload cannot be guaranteed on a device-specific basis since exact device-specific condition information (e.g., channel conditions, location, etc.) are not known to the RAN. Thus, according to conventional techniques, a RAN blindly repeats transmission of the same MBS payload via all the available downlink beams since the RAN is not 'aware' of the location(s) of idle mode user equipment and cannot determine best downlink beam(s), thus leading to a waste of idle mode spectral efficiency, for example by repeating the same MBS transmissions over beams that may not serve any idle mode user equipment device. On the other hand, a RAN may instead transmit MBS payload on a selected sub-set of downlink beams only, but this is only suitable for best effort MBS payload delivery where relaxed QoS requirement are permitted, since some MBS idle mode devices may be served by very suboptimal downlink beams. Such MBS beam relaxation strategy is not suitable for stringent MBS payload delivery.

Embodiments disclosed herein may complement conventional 5G NR techniques by transmitting MBS traffic to idle user equipment with dynamic MBS QoS adaptation and enforcement procedures. Embodiments disclosed herein may facilitate efficient delivery of MBS content traffic to a group of user equipment in idle mode (e.g., user equipment are not currently/actively connected to a radio access network node or that are not actively engaged in any data transmission) that have been configured via a subscription, or via an application, to receive the MBS content, even when the user equipment are in a low power state (e.g., RRC IDLE or RRC INACTIVE) through efficient use of multicast group management, network scheduling, and device synchronization mechanisms.

Using embodiments disclosed herein, novel radio procedures may dynamically enforce minimum MBS payload QoS performance targets while benefitting from a gain in signaling overhead reduction that may result from delivering MBS payload to user equipment in idle mode state. According to embodiments disclosed here, a radio access network node may transmit MBS traffic payload via a dynamic subset of beams that may be configured by the radio access network node to accommodate a majority of idle mode devices within range of the radio access network node that may have subscribed to receive the MBS content, thus potentially saving idle mode beam repetition overhead (e.g., by not repeating transmission of MBS content in all downlink beams available to a RAN). MBS content may be transmitted according to a multicast beam pattern to reduce repetitive transmission via beams that may not be used by any, or many, user equipment to receive MBS content traffic while in idle mode, while a minimum QoS performance may be dynamically facilitated (e.g., transmission of MBS content may change as network conditions, including number and location of user equipment change) for user equipment. Satisfaction of minimum QoS performance targets may be facilitated by a radio access network node serving user equipment either in connected mode (e.g., by causing one or more UEs to transition from idle mode to connected mode), or by dynamically updating a configured active MBS beam pattern (e.g., a subset of potential downlink beams available and usable by the radio access network node) being used to carry MBS content payload to provide a better coverage level/signal strength to idle user equipment that may report information that indicates failure to satisfy minimum QoS performance targets. Embodiments disclosed herein may comprise implementation at idle mode user equipment and at radio access network node components, and may involve novel radio signaling procedures to support dynamic idle mode MBS QoS enforcement.

Dynamic Multicast Broadcast Payload Delivery

Using embodiments disclosed herein, MBS payload associated with stringent QoS requirements may be delivered to idle mode user equipment devices, thus avoiding signaling-heavy connection establishment procedures, while dynamically enforcing the stringent QoS targets associated with the MBS traffic. Embodiments disclosed herein may comprise transmitting, by a RAN node towards idle mode user equipment devices, an idle mode MBS delivery configuration. An idle mode MBS delivery configuration, which may be referred to herein as a multicast configuration, may comprise one or more downlink beam patterns and/or one or more downlink beam pattern indications. A beam pattern, or associated beam pattern index, may correspond to one or more downlink beams via which MBS payload may be transmitted and repeated—non-indicated beams are excluded from the MBS payload transmission repetition. A multicast configuration may comprise a minimum set of QoS criterion, or criteria, that may correspond to a received coverage level, or signal strength, associated with a downlink beam, while receiving MBS payload during idle mode. A multicast configuration may comprise a set of MBS-specific preambles and/or corresponding preamble group indications.

Embodiments disclosed herein may comprise idle mode devices, which are subscribed to an idle mode MBS session to receive MBS traffic payload, receiving the idle mode MBS payload according to the multicast configuration. An idle mode user equipment may receive MBS payload via a best downlink beam from a received coverage perspective with respect to the idle mode user equipment. A downlink beam determined by the idle mode user equipment to be a best beam may be a downlink beam defined by a downlink beam pattern indication in the multicast configuration or may be a beam that is not defined by a downlink beam pattern indication in the multicast configuration. An idle mode user equipment may continuously track, monitor, measure, evaluate, calculate, or otherwise determine a received MBS QoS performance metric (e.g., a packet error rate and/or received beam coverage level) corresponding to reception of MBS payload. If determining of a MBS QoS metric satisfies a minimum configured QoS criterion/target or coverage level/signal strength, an idle mode user equipment may continue receiving MBS payload of the current MBS session without interruption.

However, if a determined MBS QoS metric does not satisfy a minimum configured QoS target/criterion or target coverage level/signal strength, an idle mode user equipment may select one or more MBS-specific preamble, from a configured pool of MBS specific preambles contained in the multicast configuration. The user equipment may transmit a selected preamble via an uplink resource occasion that is associated with a best received coverage downlink beam (e.g., having a best signal strength), as determined by the idle user equipment, even if such best downlink beam is not defined by a beam pattern in the multicast configuration that is currently being implemented by a radio access network node.

In an embodiment, at the radio access network node, based on receiving an MBS-specific preamble, the node may determine that one or more payload delivery QoS metrics is/are not satisfying at least one corresponding QoS criterion/target. Conventional uplink preamble transmissions are only for random access. A conventional paging indication/request, for paging idle mode devices, originates from either a core network entity or from a neighbor radio access network node towards a source radio access network node— location information corresponding to a paged idle mode device is not available to the radio access network node or is not 'known' by the radio access network node. In the embodiment, an MBS-idle-mode-specific preamble transmission may trigger dynamic network behavior of a radio access network node in transmitting a paging message to a user equipment that transmitted the preamble. A local RAN node/cell only pages idle devices with a locally originated paging indication. Such local origination is facilitated by the originating RAN being aware that the user equipment that transmitted the preamble is within coverage of the RAN based on the RAN receiving a MBS-specific preamble transmitted by the user equipment that is otherwise 'unknown' to the RAN. Such preamble-based paging may be referred to as single cell local paging. Accordingly, the RAN node may transmit a paging message to cause a user equipment that transmitted an MBS preamble to transition to connected mode to receive MBS payload using dedicated signaling in the connected mode.

In another embodiment, a radio access network node may dynamically update a current MBS beam pattern to a new pattern that includes the indicated best downlink beam of the performance-impacted idle mode user equipment that transmitted the preamble to facilitate the user equipment receiving the same MBS payload but via one or more better downlink beams (e.g., one or more downlink beams having a higher signal strength than a best downlink previously determined by the user equipment transmitted the preamble). Accordingly, MBS QoS targets may be dynamically determined and enforced while avoiding a large number of idle mode user equipment, receiving MBS payload traffic, unnecessarily attempting to connect to the network to receive the very same MBS payload in connected mode. Thus, user equipment may remain idle and the RAN node may only update an MBS delivery beam pattern.

Figure 2:
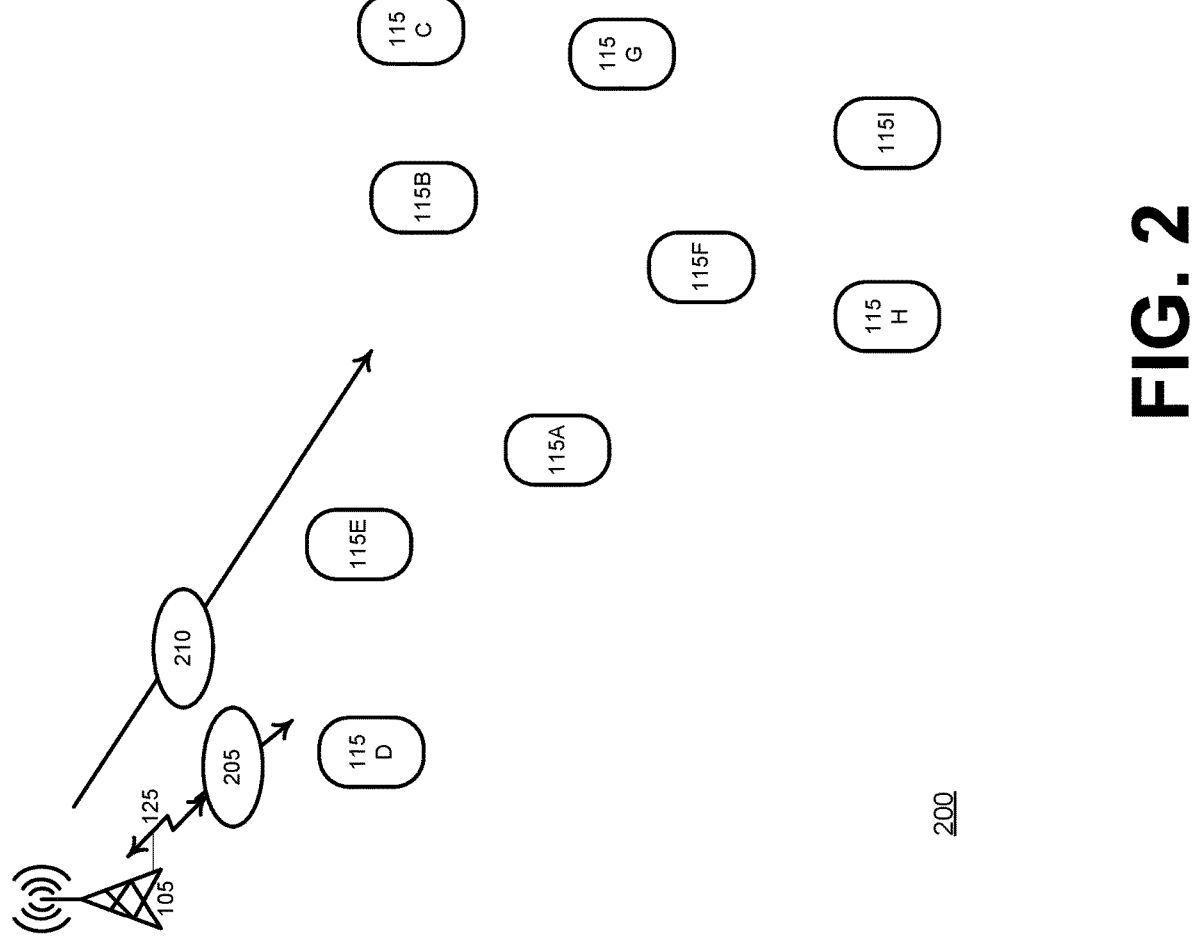
FIG. 2 illustrates an example environment with multicast content being transmitted via multicast transmission to idle state user equipment.

Turning now to FIG. 2, the figure illustrates environment 200 in which radio access network node 105 transmits to user equipment 115A-115I a multicast configuration 205 corresponding to content 210, such as, for example, a traffic flow comprising image frames that may be video image frames, to the user equipment while at least one of user equipment is idle, or in an idle mode, for example in an RRC IDLE state or more. The multicast content 210 may be transmitted to user equipment 115A-115I while the user equipment is/are idle (e.g., not in an RRC CONNECTED state).

As shown in FIG. 3, RAN 105 may transmit multicast content 210, shown in FIG. 2, to a user equipment 115 via one or more downlink beams corresponding to one or more multicast downlink beam patterns 310-0 . . . 310-n shown in FIG. 3. Multiple beam patterns 310-0 . . . 310-n may be defined, in a beam pattern list, or in a multicast configuration 205 shown FIG. 2, comprising information corresponding to multicast content payload 210 to be transmitted to one or more user equipment 115 while the user equipment is idle, or in an idle mode/state. Thus, a certain configured MBS beam pattern or pattern indication may indicate that RAN 105 may transmit multicast content to idle user equipment 115 via a repeating subset of available, active, or usable downlink beams associated with RAN 105 according to a beam pattern 310 indicated in a multicast configuration 205.

Figure 4:
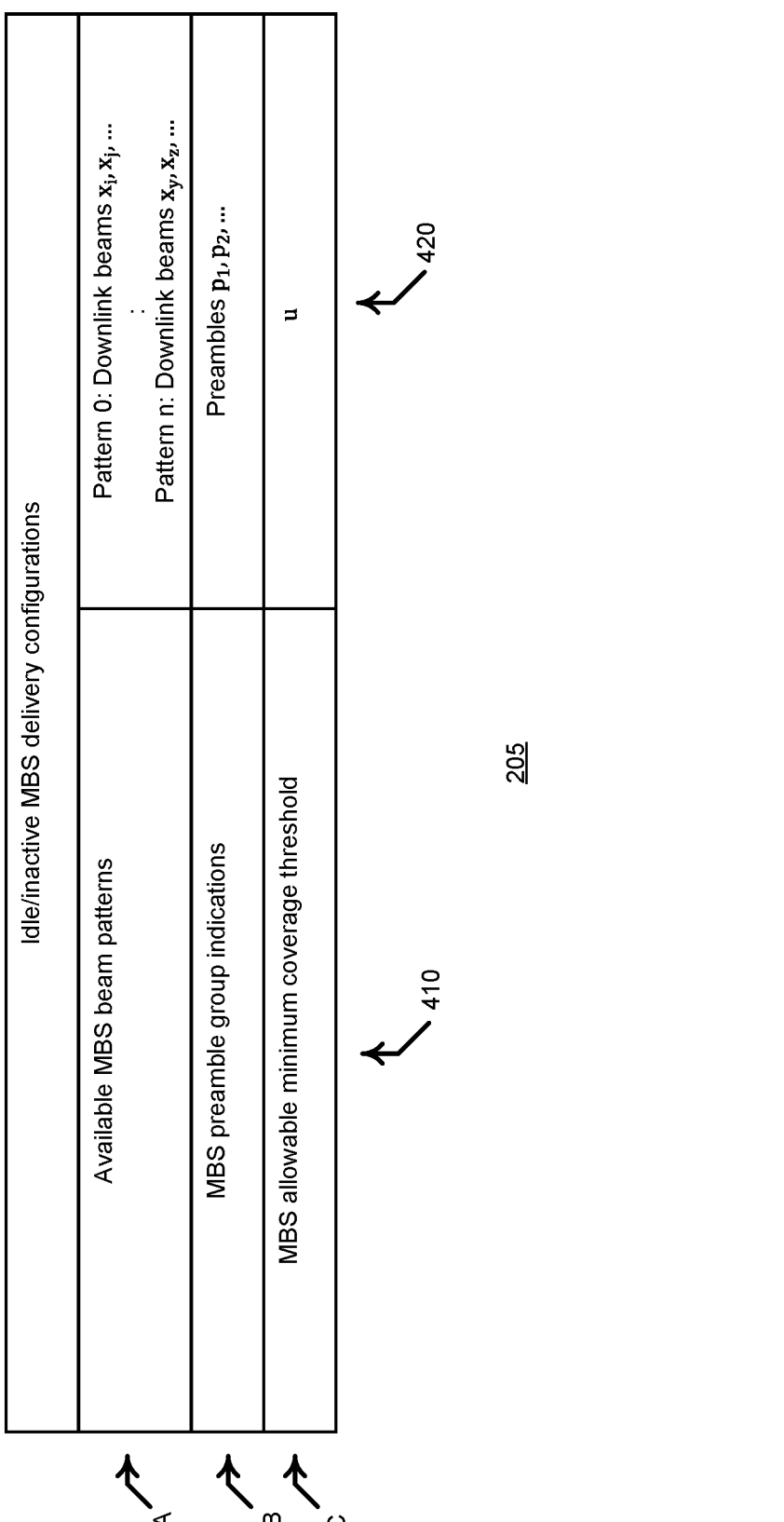
FIG. 4 illustrates an example multicast configuration.

FIG. 4 illustrates an example multicast configuration 205 described in reference to FIG. 2 and FIG. 3. Continuing with description of FIG. 4, RAN node 105 may transmit a multicast configuration 205 towards idle mode user equipment devices, which may be subscribed to receive multicast content during a multicast, or broadcast, communications session, as part of master information block/system information block signal message, and/or as part of device-specific RRC/DCI signaling before a user equipment device reverts to an idle state. Configuration 205 may comprise a multicast beam pattern list shown in block 420A, which may comprise beam pattern information corresponding to beam patterns 310-0 . . . 310-n shown in FIG. 3. The list of available MBS beam patterns 420A shown in FIG. 4 may be associated in configuration 205 with corresponding beam pattern indices shown in FIG. 410A.

Configuration 205 may comprise multicast-session-specific preamble identifiers, or preamble group identifiers, shown in block 410B. Configuration 205 may comprise multicast preambles shown in block 420B that are associated with respective preamble identifiers, or preamble group identifiers, shown in block 410B.

Configuration 205 may comprise at least one minimum idle mode multicast QoS parameter criterion, the satisfaction of which may enable, or result in, user equipment continuing to receive multicast content while in an idle state without a change (e.g., an idle UE may remain idle and/or continue receiving multicast content traffic according to a currently active MBS beam pattern configuration indicated in row A of configuration 205 shown in FIG. 4). Multiple parameter criterion may be defined by configuration 205, including an experienced packet error rate threshold or a minimum received coverage level/signal strength corresponding to signal reception associated with a downlink beam carrying multicast payload to a user equipment while idle. As shown in FIG. 4, block 410C may indicate one or more parameters (e.g., an error rate or a signal strength threshold) and block 420C may contain a value, or criterion, corresponding to a respective parameter indicated in block 410C. For example, block 410C may indicate an error rate as being a parameter and block 420C may indicate a value to use as an error rate criterion, for example 10%. Thus, in the example, a user equipment may be configured, via configuration 205, to transmit a preamble indicated in block 420B if an error rate corresponding to reception of multicast traffic content via one or more downlink beams indicated by a beam pattern in block 420A or 410A exceeds 10%, which in the example is the criterion value 'u' configured via block 420C.

Figure 5:
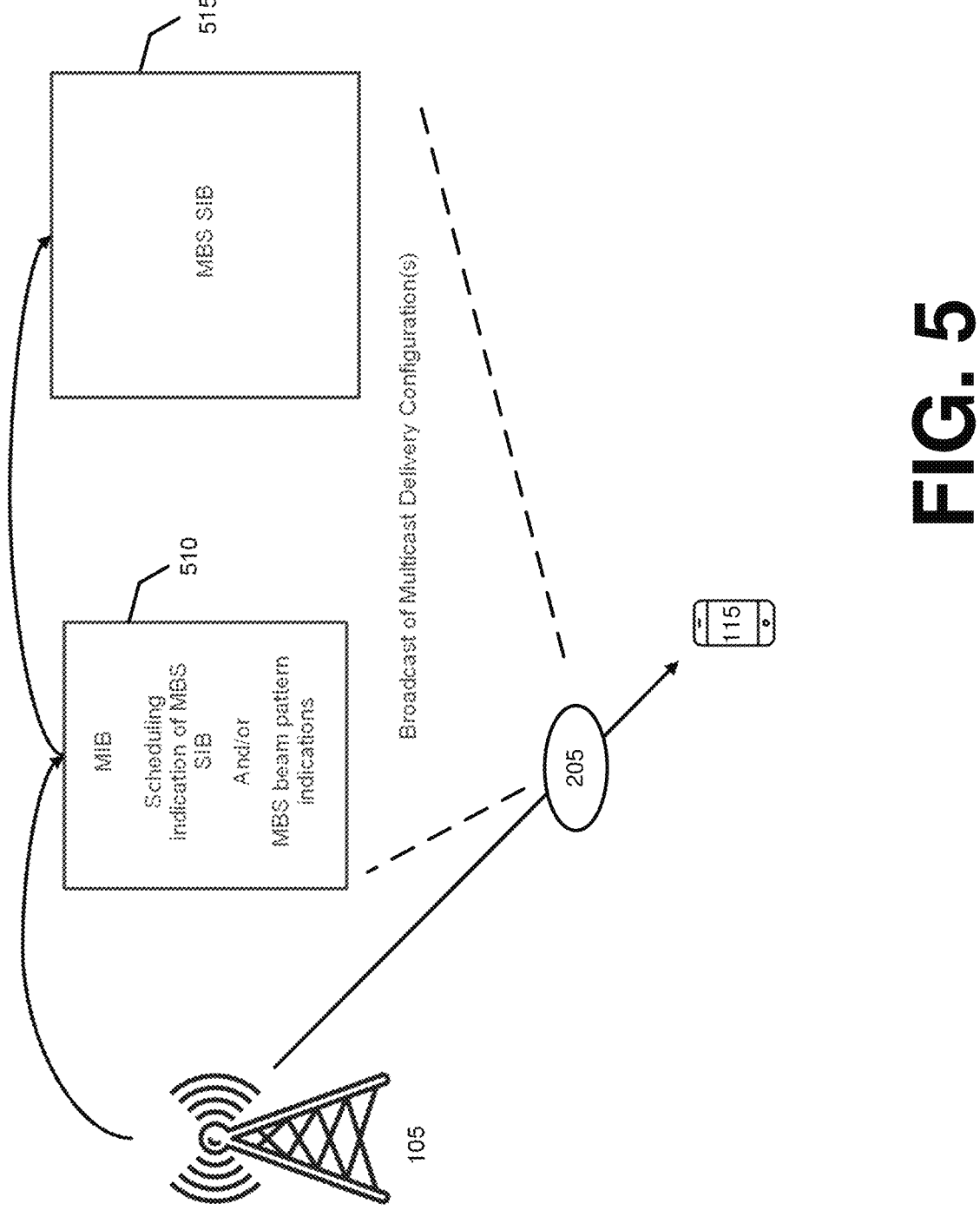
FIG. 5 illustrates an example environment with a multicast information being delivered via to a user equipment via a master information block message and via a system information block message.

As shown in FIG. 5, configuration 205 can be part of either a master information block ("MIB") signaling message 510 or may be part of a multicast-specific specific system information block ("SIB") signaling message 515. In an example embodiment, delivery of a configuration 205 may be facilitated via dedicated multicast-specific SIB 515. However, indication of scheduling of SIB 515 may be facilitated dynamically by a special multicast SIB scheduling indication contained in a preceding MIB signal message 510.

In addition, within MIB 510, a novel multicast beam pattern indication may be transmitted to indicate to idle mode user equipment devices, subscribed to receive multicast content via a given multicast session, an active and updated multicast beam pattern, in case RAN node 105 may be switching from one multicast beam pattern to another multicast beam pattern. Thus, because indicating scheduling via a SIB signal message is typically slower than indicating scheduling via a MIB signal message, an idle mode device can be more quickly configured with a multicast beam pattern change in a MIB message than if the beam pattern change is indicated via SIB signal message.

Figure 6:
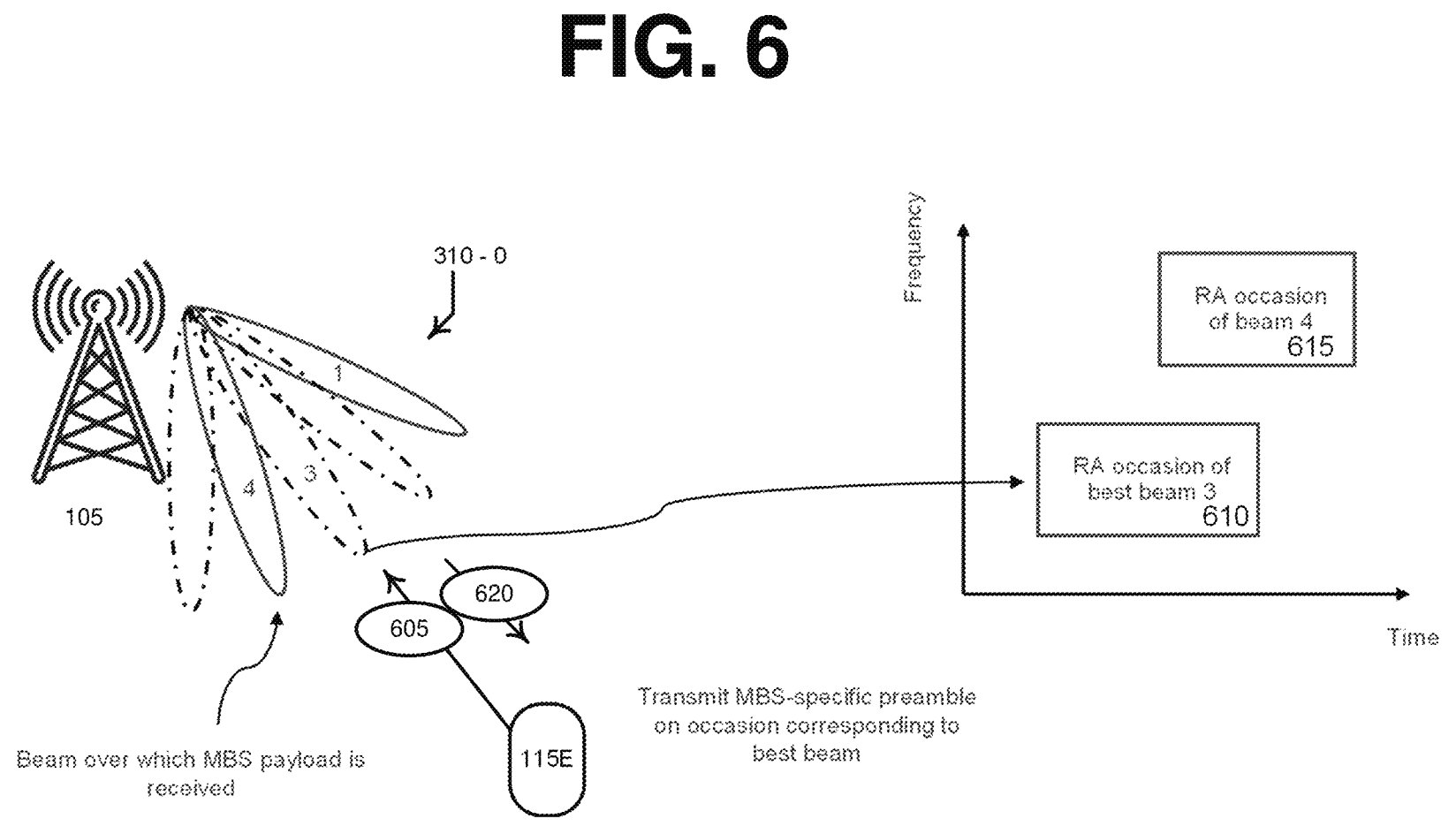

Turning now to FIG. 6, acts of embodiments disclosed are described. RAN node 105 may configure eligible idle mode user equipment 115 (UE 115E from FIG. 1 is shown for purposes of illustration but other UEs can also be configured simultaneously, or substantially simultaneously with UE 115E) with an idle mode multicast delivery configuration 205, as shown in FIG. 2. As shown in FIG. 6, a configuration 205 may indicate to UE 115E that multicast content may be multicast to UE 115E according to a beam pattern that comprises downlink beams 1 and 4 being beams that RAN 105 will use to transmit multicast content to idle mode user equipment.

UE 115E, which may be subscribed to receive multicast content during a multicast content communication session, may attempt receiving and decoding of multicast content via beams 1 or 4, according to which beam may provide the multicast payload with the best signal strength to UE 115E. As shown in FIG. 6, beam 4 may provide the best received coverage level (UE 115E is closer to a centerline of beam 4 than to a centerline of beam 1). UE 115E my attempt receiving and decoding multicast content while idle via a second or third best beam (e.g., beam 1 shown in FIG. 6).

UE 115E may measure/calculate/determine actual QoS metrics corresponding to multicast content being multicast to the user equipment, for example, the UE determines/ calculates a received coverage level of a beam carrying the multicast content and/or a received packet or frame error rate associated with receiving, by the UE, of the multicast content while in idle mode. UE 115E may compare actual measured/determined/calculated multicast QoS metric value to a configured criterion value, such as a value indicated in block 420C of configuration 205, which may be a minimum multicast QoS error rate target(s). If the determined actual error rate is below a configured error rate indicated in block 420C of configuration 205, UE 115E may remain idle and continue receiving multicast content payload according to currently configured parameters and configuration information. However, if a criterion value contained in block 420C, for example a packet error rate, is exceeded by an determined packet error rate, UE 115E may randomly select a multicast uplink preamble from a configured multicast preamble pool and/or preamble group contained in block 420B of configuration 205 shown in FIG. 4. UE 115E may transmit the selected multicast uplink preamble(s) in a preamble message 605 (shown in FIG. 6) towards RAN node 105, which is delivering multicast content payload to the UE. The selected multicast uplink preamble(s) may be transmitted via an occasion that is associated with the best downlink beam determined at the device, whether the user equipment received multicast payload while in idle mode via the best downlink beam or not. For example, radio access network node 105 may be transmitting multicast traffic to user equipment 115E via only downlink beam 1 and downlink beam 4, but user equipment 115E may determine that downlink beam 3 is actually a best downlink beam corresponding to the radio access network node with respect to the user equipment period. Accordingly, user equipment 115E may transmit preamble message 605 via a random access occasion resource 610 corresponding to downlink beam 3 instead of via a random access occasion 615, which corresponds to downlink being 4 that is the best beam via which user equipment 115E has been receiving multicast contact from radio access network node 105 while idle. RAN node 105 may receive a preamble selected from block 420B transmitted by UE 115E in preamble message 605 and identify beam 3 as being a best serving beam 3 with respect to the UE based on resource occasion 610 being the resource occasion via which the radio access network node received preamble message 605.

RAN node 105 may determine that receiving a multicast content specific preamble message 605 is not necessarily a trigger for user equipment to transition from idle to connected state. A preamble of a preamble group, or pool, 420B in configuration 205 corresponding to a multicast QoS indication, may be different from a preamble used according to conventional techniques for user equipment state transactions (e.g., different from random access channel preambles). In an embodiment, RAN node 105 may determine to continue to deliver multicast payload towards UE 115E while the UE is in IDLE mode state. However, RAN 105, based on receiving preamble message 605 via uplink resource 610 corresponding to downlink beam 3, may determine to update the active multicast beam pattern to include beam 3 to provide better beam coverage/signal strength to idle UE 115E and the RAN may indicate to the UE the updated beam pattern.

In another embodiment, based on receiving preamble message 605 via an occasion resource 610, RAN 105 may determine that transmitting multicast content to UE 115E may be most efficiently accomplished (e.g., with respect to use of network resources) by UE 115E being in a CONNECTED state, and the RAN may initiate transitioning of UE 115E to RRC-CONNECTED mode. To initiate transition of UE 115E from IDLE mode to CONNECTED mode, RAN node 105 may page UE 115E to cause the UE to transition to being in a CONNECTED state and to receive the multicast content payload using more reliable and robust device-specific scheduling grants that may be available to UE115E if the UE is in CONNECTED mode. However, because the multicast-specific paging originates at RAN node 105, which has no awareness of UE 115E due to UE 115E not being connected with the RAN node, a paging message transmitted by the RAN node and received by UE 115E may comprise a multicast preamble identifier that is contained in block 410A of configuration 205 and that is respectively associated with a preamble that was transmitted by UE 115E in message 605. Thus, instead of a conventional paging record transmission message that includes an identifier associated with a paged user equipment (e.g., an identifier uniquely corresponding to UE 115E), a multicast-specific paging message 620 may contain a multicast-specific preamble or an identifier associate therewith in configuration 205. Accordingly, UE 115E may undertake connection establishment procedures to transition to CONNECTED state based on receiving and successfully decoding paging message 620 and determining that an indication in paging message 620 corresponds to a multicast-specific preamble that UE 115E transmitted in preamble message 605, which the UE had previously transmitted for purposes of indicating a QoS parameter metric having violated a configured QoS parameter metric criterion (e.g., an error rate corresponding to receiving multicast traffic while in idle mode via beam 3 exceeded an error rate configured in the UE via block 420C of configuration 205).

Preamble-Based Paging

Figure 7:
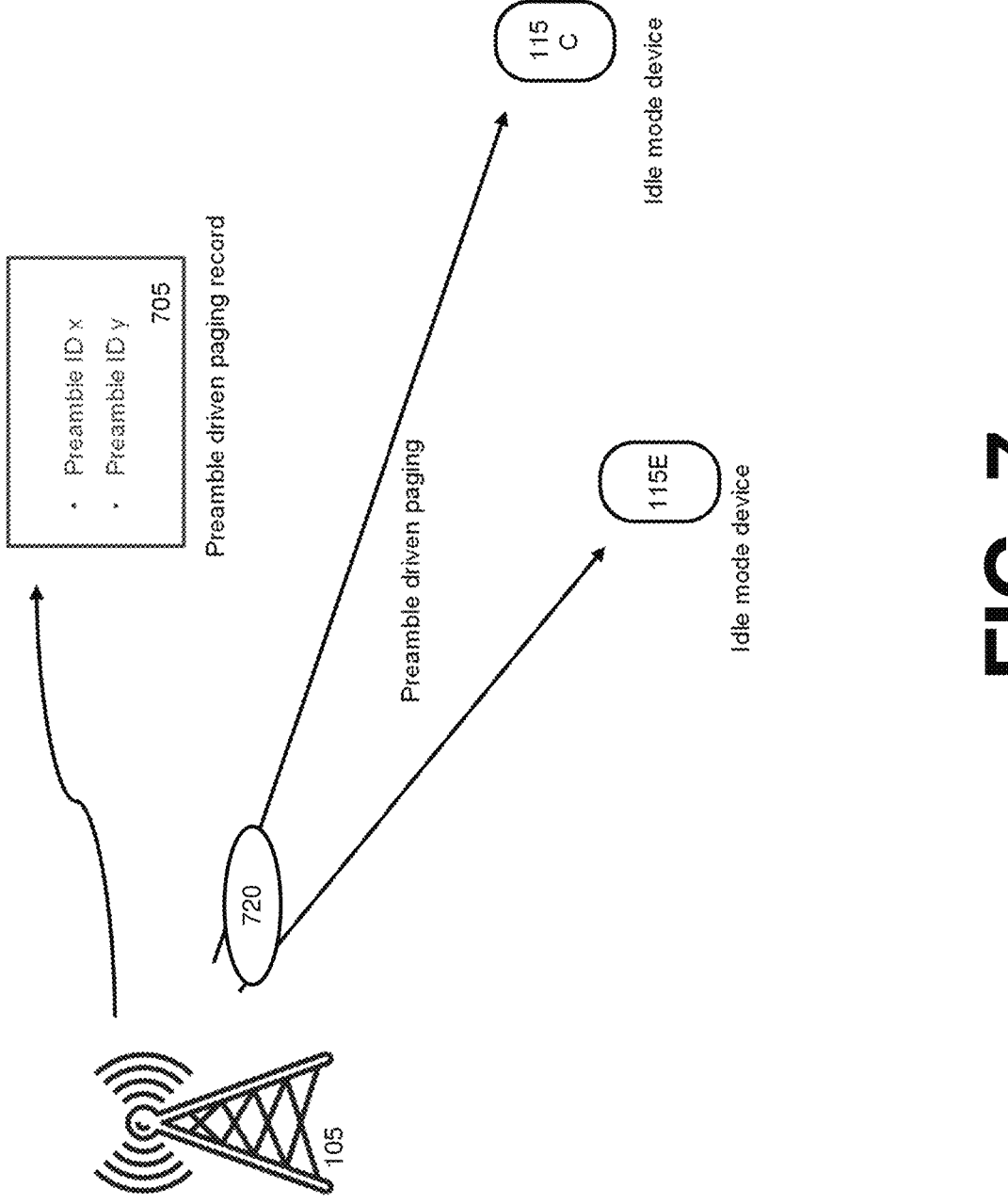
FIG. 7 illustrates an example environment with an idle state user equipment being paged based on the transmitting of a preamble by the user equipment while in an idle state.

Turning now to FIG. 7, the figure illustrates a preamble driven paging embodiment, which may be referred to as preamble-based paging. Conventional paging procedures facilitate notifying idle mode user equipment devices about incoming calls or available data arrivals. Thus, idle mode devices are typically configured to periodically monitor and decode designated paging channels and/or resources potentially to receive paging indications from a currently selected (e.g., 'camped on') RAN node. A conventional paging indication contains an identifier of a user equipment to which a paging message is directed. A user equipment identifier that is contained in a conventional paging message may be received by a RAN node from an entity of core network 130 (shown in FIG. 1) since data available for the user equipment or an incoming call is typically received from an entity of the core network and is directed to a specific user equipment device according to a unique identifier corresponding to the user equipment. Thus, a user equipment conventionally searches for a device identifier corresponding to the user equipment within a paging indication message and if the user equipment determines that its own identifier is present in the paging message the user equipment initiates a connection towards the serving RAN node.

However, when a user equipment is idle, or in an idle state, meaning that the user equipment is not connected with the radio access network node, the radio access network node, or an entity of core network 130, is not aware of, or does not have 'knowledge' that the user equipment is within signaling range of the radio access network node. Thus, a preamble-driven paging procedure as shown in FIG. 7 may be used to facilitate radio access network node 105 transmitting a paging message 720 to cause a user equipment 115 to initiate transitioning from IDLE mode to CONNECTED mode. Continuing with the example described in reference to FIG. 6, as shown in FIG. 7 RAN node 105 may transmit paging indication 720, (e.g., a broadcast paging record signaling message 705) to page devices 115 that may have just attempted transmitting a preamble to the RAN via a resource associated with a downlink beam corresponding to the RAN. Paging message 720 may comprise one or more preamble identifiers that are associated in configuration 205 with one or more preambles that may have been transmitted by idle user equipment. Thus, based on receiving a preamble transmitted by an idle user equipment, a radio access network node may be able to on-demand page an idle mode device of interest, without knowing identifiers corresponding to the user equipment, based on having received a preamble that is associated in a configuration 205 with a preamble identifier. For example, if UE 115E transmitted a preamble corresponding to preamble $ID_x$, RAN 105 may transmit a paging message 720 to be received by whichever UE transmitted the preamble without the RAN having information that UE 115E was the UE that transmitted the preamble. Similarly, at about the same time that RAN 105 receives a preamble corresponding to preamble $ID_x$, the RAN may have also received a preamble corresponding to preamble $ID_y$. If UE 115C transmitted the preamble corresponding to preamble $ID_y$, UE 115C may also begin RRC connection establishment procedures based on receiving preamble paging message 720 even though the paging message does not comprise identifier information corresponding to UE 115C.

Paging message 720 may be transmitted according to conventional paging signaling techniques but according to a special resource set. In an embodiment, an idle mode user equipment may monitor configured standard paging resources (e.g., to facilitate receiving a standard page for a call) and resources configured for preamble based paging. Thus, both paging messages (conventional and preamble-based) are separated, and user equipment not configured to receive preamble paging are not impacted.

In another embodiment, a preamble message 720 may be transmitted via the same resources as may be configured for standard paging multiplexing techniques. However, although using multiplexing to transmit preamble-based paging message may conserve resource, user equipment not interested or not supporting preamble paging may be impacted. For example, at a certain paging time only one preamble-based paging indication may be transmitted, but all user equipment attempt decoding the received paging message, even user equipment that do not support preamble based paging. User equipment not configured for preamble-based paging will attempt and fail to decode a preamble-based message and will simply disregard the paging message, but such attempting and failing to decode the preamble-based paging message results in energy consumption by the user equipment in performing an action that will never be successful.

Preamble-based paging may be useful in multiple use case scenarios where user equipment device identifiers are not available to a radio access network node when the radio access network node pages a user equipment. For example, as described herein, preamble-based paging may be useful to facilitate multicast content being delivered to idle user equipment. When an idle user equipment experiences poor channel conditions and attempts transmitting a multicast preamble in the uplink direction, a radio access network node may determine to continue delivery of the multicast content to the user equipment that transmitted the multicast preamble, but with the idle user equipment being transitioned to a connected mode so that the idle use equipment becomes a connected user equipment. By being in connected mode, a user equipment can take advantage of better beam availability, scheduled downlink resource grants, and the like that are associated with connected mode transmission. A radio access network node cannot use standard paging procedures to cause a user equipment to transition to connected mode because an identifier corresponding to the user equipment is not known to the radio access network node. Using preamble-based paging can facilitate a radio access network node directing a paging message to a specific user equipment to cause the user equipment to transition to connected mode without the radio access network node having available identification information corresponding to the user equipment when the radio access network node transmits a paging message.

In another use case embodiment, preamble-based paging may facilitate uplink transmission of small data transmission ("SDT") data by an idle mode user equipment. Uplink SDT by an idle user equipment may facilitate idle mode user equipment devices being able to transmit small sized uplink payload as part of the uplink control signaling without transitioning to the connected state. According to an embodiment, an idle mode device may transmit an uplink preamble appended to uplink SDT data or appended to a subsequent RRC control signal message. In case of poor or unstable channel conditions, the transmission of the uplink control signaling, which may be carrying the uplink payload, may repetitively fail. Accordingly, due to the multiple failures, a radio access network node receiving a preamble appended to a SDT data transmission may determine to page the user equipment, using preamble-based paging, to cause the user equipment to transition to connected mode operation since the radio access network node cannot use conventional identification-based paging due to the idle mode user equipment's device identification information not being available. Thus, using embodiments shown in and described in reference to FIG. 7, radio access network node 105 may transmit one or more preamble identifiers in paging message 720, (e.g., as a broadcast paging record signaling) to indicate to one or more user equipment that may have recently transmitted a preamble corresponding to one of the preamble identifiers contained in message 720 to begin RRC connection establishment procedures.

Turning now to FIG. 8, the figure illustrates a timing diagram of an example method 800. At act 805, idle/Inactive WTRU 115 may receive an idle/inactive mode multicast broadcast ("MBS") configuration, such as configuration 205 described in reference to FIGS. 2-4, as part of broadcast MIB/SIB downlink signaling. A configuration received at act 805 may comprise: (a) a list of available idle/inactive mode beam sweeping patterns for idle/inactive MBS payload delivery, and associated indications, (b) an idle/inactive MBS-specific minimum beam received coverage threshold to avoid triggering connected mode MBS delivery, and (c) an idle/inactive MBS-specific uplink preamble group and associated preambles or preambles IDs for requesting idle/inactive MBS beam inclusions and/or transitioning to connected-mode MBS delivery. At act 810, idle/inactive WTRU 115 may receive and attempt decoding idle/inactive MBS content payload via downlink beams corresponding to currently active idle/inactive beam pattern that may be indicated in the configuration received at act 805. On condition of determining a downlink beam coverage level, or signal strength, that is lower than a configured idle/inactive MBS-specific coverage threshold configured by the configuration received at 805, at act 815 WTRUUE 115 may select an idle/inactive MBS preamble, from configured MBS preambles, or configured preamble groups, contained in the configuration received at act 805. At act 820, idle/inactive WTRU/UE 115 may transmit an MBS preamble, selected at act 815, via an uplink resource occasion that is associated with a downlink beam determined by UE 115 to be a best downlink beam (e.g., a downlink beam corresponding to RAN 105 having a strongest signal strength of multiple downlink beams corresponding to RAN 105). The downlink beam corresponding to the uplink beam, via which UE 115 uses to transmit at act 820 the preamble selected at act 815, may not be a downlink beam of a currently active downlink beam pattern used by RAN 105 to transmit MBS traffic that UE 115 receives at act 810. At act 825, RAN 105 may transmit an updated idle/inactive MBS beam pattern activation indication. At act 830, UE 115 may receive the updated idle/inactive MBS beam pattern activation indication transmitted by RAN 105 at act 825 and may receive from RAN 105, and attempt decoding, MBS traffic according to one or more beams corresponding to an updated beam pattern indicated by the updated beam pattern activation indication received at act 825.

Figure 9:
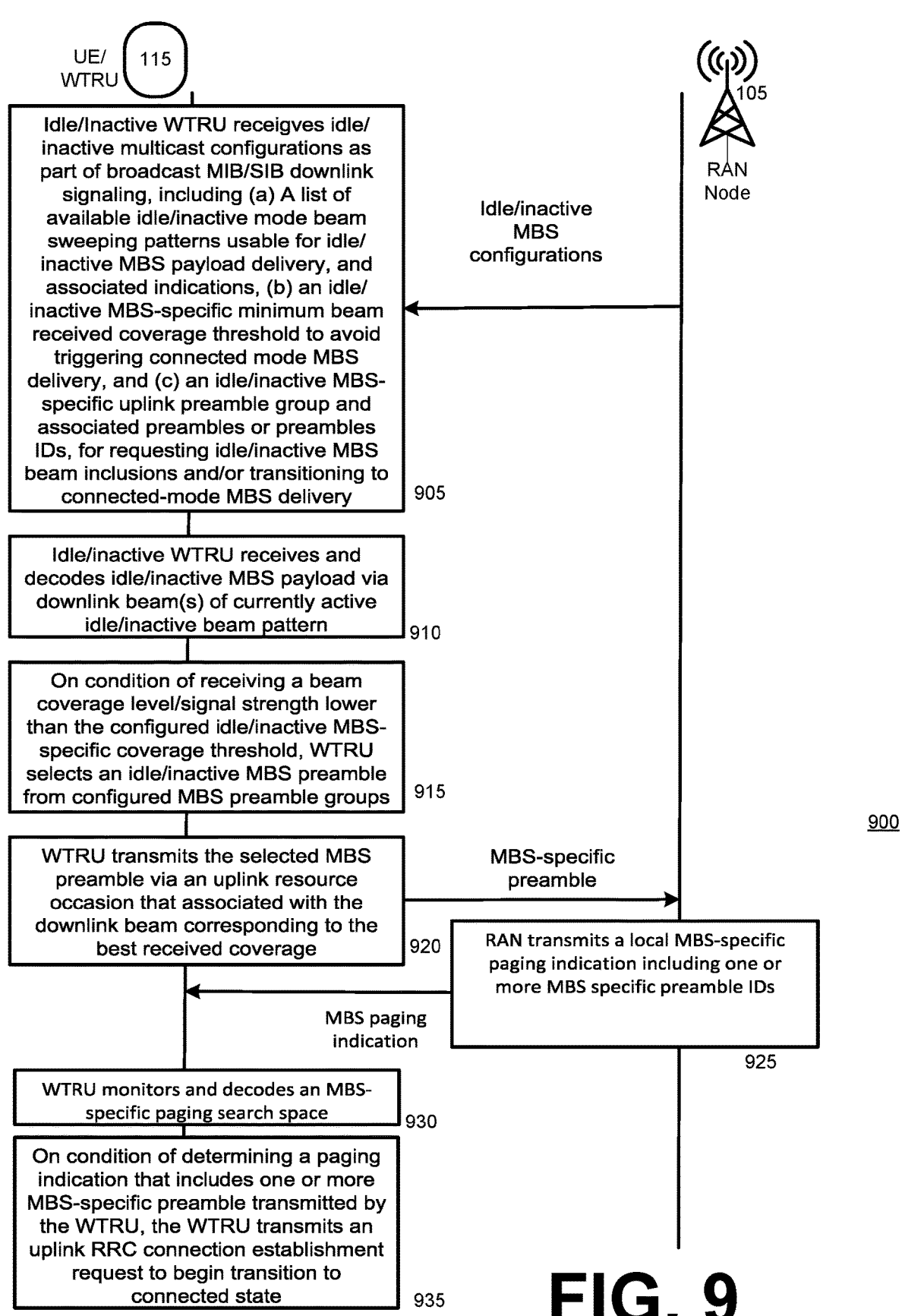
FIG. 9 illustrates a timing diagram of an example method to page an idle state user equipment to transition to a connected state based on the user equipment transmitting a preamble while in the idle state.

Turning now to FIG. 9, the figure illustrates a timing diagram of a method 900. At act 905, idle/Inactive WTRU 115 may receive an idle/inactive mode multicast broadcast ("MBS") configuration, such as configuration 205 described in reference to FIG. 4, as part of the broadcast MIB/SIB downlink signaling. A configuration received at act 905 may comprise: (a) a list of available idle/inactive mode beam sweeping patterns of idle/inactive MBS payload delivery, and associated indications, (b) an idle/inactive MBS-specific minimum beam received coverage threshold to avoid triggering connected mode MBS delivery, and (c) an idle/inactive MBS-specific uplink preamble group and associated preambles or preambles IDs, for requesting idle/inactive MBS beam inclusions and/or transitioning to connected-mode MBS delivery. At act 910, idle/inactive WTRU 115 may receive and attempt decoding idle/inactive MBS content payload via downlink beams corresponding to currently active idle/inactive beam pattern that may be indicated in the configuration received at act 905. On condition of determining a downlink beam coverage level that is lower than a configured idle/inactive MBS-specific coverage threshold configured by the configuration received at 905, at act 915 WTRUUE 115 may select an idle/inactive MBS preamble, from configured MBS preambles, or configured preamble groups, contained in the configuration received at act 905. At act 920, idle/inactive WTRU/UE 115 may transmit an MBS preamble, selected at act 915, via an uplink resource occasion that is associated with a downlink beam determined by UE 115 to be a best downlink beam (e.g., a downlink beam corresponding to RAN 105 having a strongest signal strength of multiple downlink beams corresponding to RAN 105). The downlink beam corresponding to the uplink beam, via which UE 115 uses to transmit at act 920 the preamble selected at act 915, may not be a downlink beam of a currently active downlink beam pattern used by RAN 105 to transmit MBS traffic that UE 115 receives at act 910.

At act 925, RAN 105 may transmit paging a message via a configured MBS multicast search space that may be configured according to information contained in the configuration received at act 905. The paging message may comprise a preamble identifier corresponding to the preamble that user equipment 115 transmitted at act 920. At act 930, UE 115 may receive and decode the paging message transmitted by RAN 105 at act 925 and may determine that the paging message comprises the preamble identifier corresponding to the preamble transmitted by the user equipment at act 920, which preamble identifier is associated with the preamble in the configuration received at act 905. Based on determining, by user equipment 115 at act 930, that the paging message comprises a preamble identifier corresponding to the preamble that the user equipment transmitted at act 920, at act 935 the user equipment may transmit to radio access network node 105 a connection establishment request requesting establishment of a connection between the user equipment and the radio access network node such that the user equipment transitions from being in an idle state to being in a connected state. After transitioning to being a connected user equipment, user equipment 115 may begin receiving multicast/broadcast content according to granted connected-mode resources that may provide better transport of the content than may have been achievable, with respect to the user equipment being in idle mode, using resources and beam patterns indicated in the configuration received at act 905.

Turning now to FIG. 10, the figure illustrates a flow diagram of an example method 1000. Method 1000 begins at act 1005. At act 1015, one or more user equipment may subscribe to receive, while in an idle mode, multicast or broadcast ("MBS") content from a radio access network node. The term 'multicast' may be used herein to refer to multicast or broadcast.

At act 1020, the radio access network node may transmit a multicast configuration to one or more user equipment that may have subscribed to receive multicast content while in an idle mode. The multicast configuration transmitted at act 1020 make comprise information shown and described with respect to configuration 205 shown in FIG. 4. The one or more user equipment that subscribed to receive multicast content while in an idle mode may enter idle mode operation at act 1025. At act 1030, the radio access network node may transmit multicast content, and one or more of the idle user equipment may receive the multicast content, via one or more downlink beams defined in the multicast configuration transmitted at act 1020. At act 1035, an idle mode user equipment may determine one or more multicast metrics associated with one or more downlink beams corresponding to the radio access network node that is transmitting the multicast content. A multicast metric determined at act 1035 may comprise a signal strength or coverage level associated with a downlink beam corresponding to the radio access network node. A multicast metric determined at act 1035 may comprise a data error rate corresponding to multicast content being transmitted at act 1030. The idle user equipment may determine signal strengths/coverage levels for downlink beams other than just downlink beams defined in the configuration transmitted at act 1020 as being downlink beams via which the radio access network node will transmit multicast content to the one or more idle mode user equipment. Thus, a user equipment may determine a signal strength/coverage level for not only a downlink beam via which the user equipment receives multicast content while in an idle mode but also for one or more downlink beams that may be adjacent to a downlink beam that is configured via the configuration transmitted at 1020 to be used to transmit multicast content to idle mode user equipment.

At act 1040, an idle mode user equipment that determined downlink beam metrics at act 1035 may determine whether a beam metric corresponding to a beam, via which multicast content has been received by the user equipment, violates a beam metric criterion. For example, a beam metric criterion may be a signal strength threshold and the user equipment may determine at act 1040 whether a signal strength corresponding to a downlink beam via which the idle mode user equipment has received multicast content exceeds the signal strength threshold. If the determined, or measured, signal strength corresponding to the downlink beam via which the user equipment has received multicast content while in idle mode is not at least as strong as the signal strength threshold, the signal strength corresponding to the receiving downlink beam may be deemed to violate the signal strength threshold. If a determination is made at act 1040 that a measured signal strength is stronger than, or better than, the signal strength criterion/threshold, method 1000 returns to act 1030 and a user equipment continues to receive, while in idle mode, multicast content transmitted according to a beam pattern configured in the configuration transmitted it act 1020.

Returning to description of act 1040, if a user equipment determines that a measured signal strength is not as strong as, or not as good as, a signal strength threshold, which may have been configured via the configuration transmitted at act 1020, method 1000 advances to act 1045. At act 1045, the idle mode user equipment may transmit a preamble contained in the multicast configuration transmitted at act 1020 via a configured uplink occasion corresponding to a downlink beam determined at act 1035 to be a best, or a strongest, downlink beam corresponding to the radio access network node. The downlink beam determined at act 1035 to be a best downlink beam may not be a downlink beam that has actively been transmitting multicast content to idle mode user equipment according to a beam pattern defined in the configuration transmitted at act 1020. For example, as shown in FIG. 6, idle mode user equipment 115E may only receive multicast content via downlink beams 1 and 4 according to multicast beam pattern 310-0, but the user equipment may determine that downlink beam 3 corresponding to radio access network node 105, is a best downlink beam (e.g., a downlink beam having a strongest signal strength, with respect to the user equipment) of downlink beams associated with the radio access network node. Thus, user equipment 115E may transmit a preamble contained in a configuration transmitted at act 1020 via uplink occasion resources 610 shown in FIG. 6 associated with downlink beam 3 instead of via uplink occasion resources 615 associated with downlink beam 4.

Continuing with description of FIG. 10, the radio access network node may receive the preamble transmitted at act 1045 and may receive other preambles that may have transmitted by other idle mode user equipment. At act 1055, the radio access network node may determine whether preambles have been received from idle mode user equipment in addition to the preamble transmitted it act 1045. If the radio access network node determines at act 1055 that multiple preambles have been transmitted via uplink occasion resources corresponding to a downlink beam associated with the radio access network node that is not a downlink beam defined in a configuration transmitted at act 1020, the radio access network node may at act 1065 update the multicast configuration to comprise updated beam patter information. The updated multicast configuration may comprise updated beam pattern information corresponding to an updated beam pattern. The radio access network node may transmit the updated multicast configuration to one or more user equipment that may have transmitted a preamble via uplink resources corresponding to a downlink beam that may not have been previously configured in a multicast configuration, and the radio access network node may proceed to transmit multicast content to the idle mode user equipment according to the updated beam pattern at act 1030.

Returning to description of act 1055, if the radio access network node determines that preambles from user equipment other than a user equipment that transmitted the preamble at 1045 have not been received by the radio access network node, method 1000 may advance to act 1070. At act 1070, the radio access network node may transmit a multicast paging message, for example paging message 720 shown in FIG. 7, to a user equipment that transmitted the preamble at act 1045. The paging message may comprise functional information. Functional information may comprise at least one of: radio resource control connection establishment information usable by the idle user equipment to establish a connection with the radio access network node, updated system information, or emergency notification information. The paging message may comprise an identifier associated, in the configuration transmitted it act 1020, with the preamble that was transmitted at act 1045. The configuration transmitted at act 1020 may comprise a multicast paging occasion indication indicative of at least one multicast paging occasion resource usable by idle mode user equipment to monitor and receive the paging message transmitted at act 1070. At act 1075, the user equipment may monitor the configured multicast paging occasion resource and decode the multicast paging message transmitted at act 1070. At act 1073, the user equipment may determine whether a preamble identifier contained in the paging message received at act 1070 is associated in the configuration that was transmitted and act 1020 with the preamble that the user equipment transmitted at act 1045. If a determination made at act 1073 is that a preamble identifier contained in the paging message received at act 1070 is not associated with the preamble that the user equipment transmitted at act 1045, the user equipment may continue to receive multicast content via downlink beams defined in the configuration received at act 1020, or according to beams of an updated beam pattern that may have been updated by the radio access network node at act 1065.

Continuing with description of act 1073, if a user equipment determines that a paging message received at act 1070 comprises an identifier associated in the configuration transmitted at act 1020 with a preamble that the user equipment transmitted at act 1045, method 1000 advances to act 1075, and the idle user equipment may begin RRC connection establishment procedures to establish a connection with the radio access network node. At act 1080, the idle user equipment and radio access network node may establish a connection thus resulting in the idle user equipment becoming a connected user equipment. At act 1085, the radio access network node may transmit the multicast content to the now-connected-mode user equipment according to downlink resources that may have been granted or scheduled according to the connection established at act 1080. Method 1000 advances to act 1090 and ends. Return of method 1000 from act 1090 to act 1030 is shown with a dashed line to indicate that receiving of multicast content may be ongoing. The line connecting act 1090 to act 1030 is also shown as a dashed line to indicate that if channel conditions relative to a downlink beam used by the radio access network node to transmit multicast content via a multicast beam pattern indicated in a multicast configuration, or in an updated multicast configuration, have improved relative to a user equipment that may have transitioned from being an idle mode user equipment to a connected mode user equipment, the user equipment may be transitioned from connected mode back to idle mode to continue receiving the multicast content according to a multicast configuration, or according to an updated multicast configuration.

Turning now to FIG. 11, the figure illustrates an example embodiment method 1100 comprising at block 1105 facilitating, by a radio access network node comprising a processor, receiving traffic to be transmitted for reception by at least one user equipment; at block 1110 determining, by the radio access network node, at least one resource usable by the radio access network node to transmit the traffic to result in at least one determined transmission resource, wherein the determining the at least one transmission resource excludes evaluation of channel condition information corresponding to the at least one user equipment; at block 1115 facilitating, by the radio access network node, transmitting a first portion of the traffic for reception by the at least one user equipment according to the at least one determined transmission resource; at block 1120 facilitating, by the radio access network node, transmitting, to the at least one user equipment, a multicast configuration comprising at least one idle mode multicast beam pattern; and at block 1125 wherein the traffic is associated with a target quality of service, and wherein the multicast configuration further comprises at least one multicast preamble usable by the at least one user equipment to indicate to the radio access network node that the at least one user equipment has received the first portion of the traffic according to the at least one idle mode multicast beam pattern with an associated received quality of service that does not satisfy the target quality of service.

Turning now to FIG. 12, the figure illustrates a radio access network node 1200, comprising at block 1205 a processor configured to transmit, to at least one user equipment, a multicast configuration comprising downlink beam pattern information indicative of a first downlink beam of at least one downlink beam usable by the at least one user equipment to receive traffic corresponding to a multicast content session, wherein the traffic corresponding to the multicast content session is associated with a target quality of service; at block 1210 transmit, to the at least one user equipment, a first portion of the traffic corresponding to the multicast content session according to the downlink beam pattern information; at block 1215 receive, from the at least one user equipment, a channel condition message comprising a channel condition indication indicative that the at least one user equipment has received the first portion of the traffic corresponding to the multicast content session, via the first downlink beam of the at least one downlink beam, with a received quality of service that fails to satisfy the target quality of service; at block 1220 based on the channel condition indication, determine a second downlink beam of the at least one downlink beam to result in a determined second downlink beam; at block 1225 transmit a second portion of the traffic corresponding to the multicast content session according to the determined second downlink beam; at block 1230 wherein the first downlink beam of the at least one downlink beam is a first downlink beam associated with a first downlink beam pattern, wherein the multicast configuration further comprises a second downlink beam pattern, wherein the multicast configuration further comprises a multicast beam pattern index associated with the second downlink beam pattern; at block 1235 wherein the processor is further configured to transmit, to the at least one user equipment, a multicast beam pattern update message comprising the multicast beam pattern index to indicate to the at least one user equipment to receive the second portion of the traffic corresponding to a multicast content session according to the second downlink beam pattern; and at block 1240 wherein the multicast configuration further comprises at least one multicast preamble usable by the at least one user equipment to indicate to the radio access network node that the at least one user equipment has received the first portion of the traffic corresponding to the multicast content session according to the first downlink beam pattern with a received quality of service that does not satisfy the target quality of service.

Turning now to FIG. 13, the figure illustrates a non-transitory machine-readable medium 1300 comprising at block 1305 executable instructions that, when executed by a processor of a network node that is part of a radio access network, facilitate performance of operations, comprising transmitting, to at least one idle user equipment, a multicast configuration comprising downlink beam pattern information indicative of at least one first resource corresponding to a first multicast downlink beam pattern and at least one second resource corresponding to a second multicast downlink beam pattern usable by the at least one idle user equipment to receive traffic corresponding to multicast content that is associated with a target quality of service; at block 1310 determining to transmit, to the at least one idle user equipment, the traffic corresponding to the multicast content according to the first multicast downlink beam pattern to result in a determined first beam pattern, wherein the determining the determined first beam pattern excludes evaluation of channel condition information corresponding to the at least one idle user equipment; at block 1315 transmitting, to the at least one idle user equipment, a first portion of the traffic corresponding to the multicast content according to the determined first beam pattern; at block 1320 receiving, from the at least one idle user equipment, a channel condition message comprising a channel condition indication indicative that the at least one idle user equipment has received the first portion of the traffic corresponding to the multicast content according to the determined first beam pattern with a received quality of service that does not satisfy the target quality of service; at block 1325 based on the channel condition indication, determining to transmit to the at least one idle user equipment the traffic corresponding to the multicast content according to an updated resource; and at block 1330 transmitting, to the at least one idle user equipment, a second portion of the traffic corresponding to the multicast content according to the updated resource.

Turning now to FIG. 14, the figure illustrates an example embodiment method 1400 comprising at block 1405 facilitating, by a radio access network node comprising a processor, receiving a preamble from an idle user equipment; at block 1410 based on the preamble, facilitating, by the radio access network node, transmitting, to the idle user equipment, a paging message comprising functional information; at block 1415 wherein the functional information comprises at least one of: radio resource control connection establishment information usable by the idle user equipment to establish a connection with the radio access network node, updated system information, or emergency notification information; and at block 1420 wherein the paging message is initiated by the radio access network node.

Turning now to FIG. 15, the figure illustrates an example radio access network node 1500, comprising at block 1505 a processor configured to transmit, to at least one user equipment, an idle state configuration comprising at least one idle state preamble and at least one idle state preamble identifier corresponding to the at least one idle state preamble; at block 1510 receive the at least one idle state preamble from an idle user equipment of the at least one user equipment; at block 1515 responsive to the at least one idle state preamble, transmit to the idle user equipment a paging message comprising the at least one idle state preamble identifier associated with the at least one idle state preamble and connection establishment information, wherein the paging message excludes identifying information associated with the idle user equipment; at block 1520 receive, from the idle user equipment, a connection establishment request message transmitted by the idle user equipment in response to the connection establishment information; and at block 1525 responsive to the connection establishment request message, establish a connection with the idle user equipment to result in the idle user equipment being a connected user equipment.

Turning now to FIG. 16, the figure illustrates a non-transitory machine-readable medium 1600 comprising at block 1605 executable instructions that, when executed by a processor of a network node that is part of a radio access network, facilitate performance of operations, comprising transmitting, to a first user equipment and a second user equipment, an idle state configuration comprising at least one idle state preamble and at least one idle state preamble identifier corresponding to the at least one idle state preamble and usable by the first user equipment while in a first idle state or the second user equipment while in a second idle state, to indicate, to the network node, a channel condition corresponding to a downlink resource associated with the radio access network node; at block 1610 transmitting, to the first user equipment while the first user equipment is in the first idle state and to the second user equipment while the second user equipment is in the second idle state, traffic via the downlink resource associated with the network node; at block 1615 receiving, from the first user equipment, the at least one idle state preamble, wherein the at least one idle state preamble was transmitted by the first user equipment while in the first idle state; at block 1620 responsive to the at least one idle state preamble, transmitting, to the first user equipment while the first user equipment is in the first idle state and during a paging occasion that is nonspecific to the first user equipment, a paging message comprising the at least one idle state preamble identifier associated with the at least one idle state preamble, wherein the paging message excludes identifying information associated with the idle user equipment; at block 1625 receiving, from the first user equipment, a connection establishment request message transmitted by the first user equipment in response to receiving the at least one idle state preamble identifier via the paging message while the first user equipment is in the first idle state; and at block 1630 responsive to the connection establishment request message, establishing a connection with the first user equipment to result in the first user equipment being a connected first user equipment in communication with the network node via an established connection.

Figure 17:
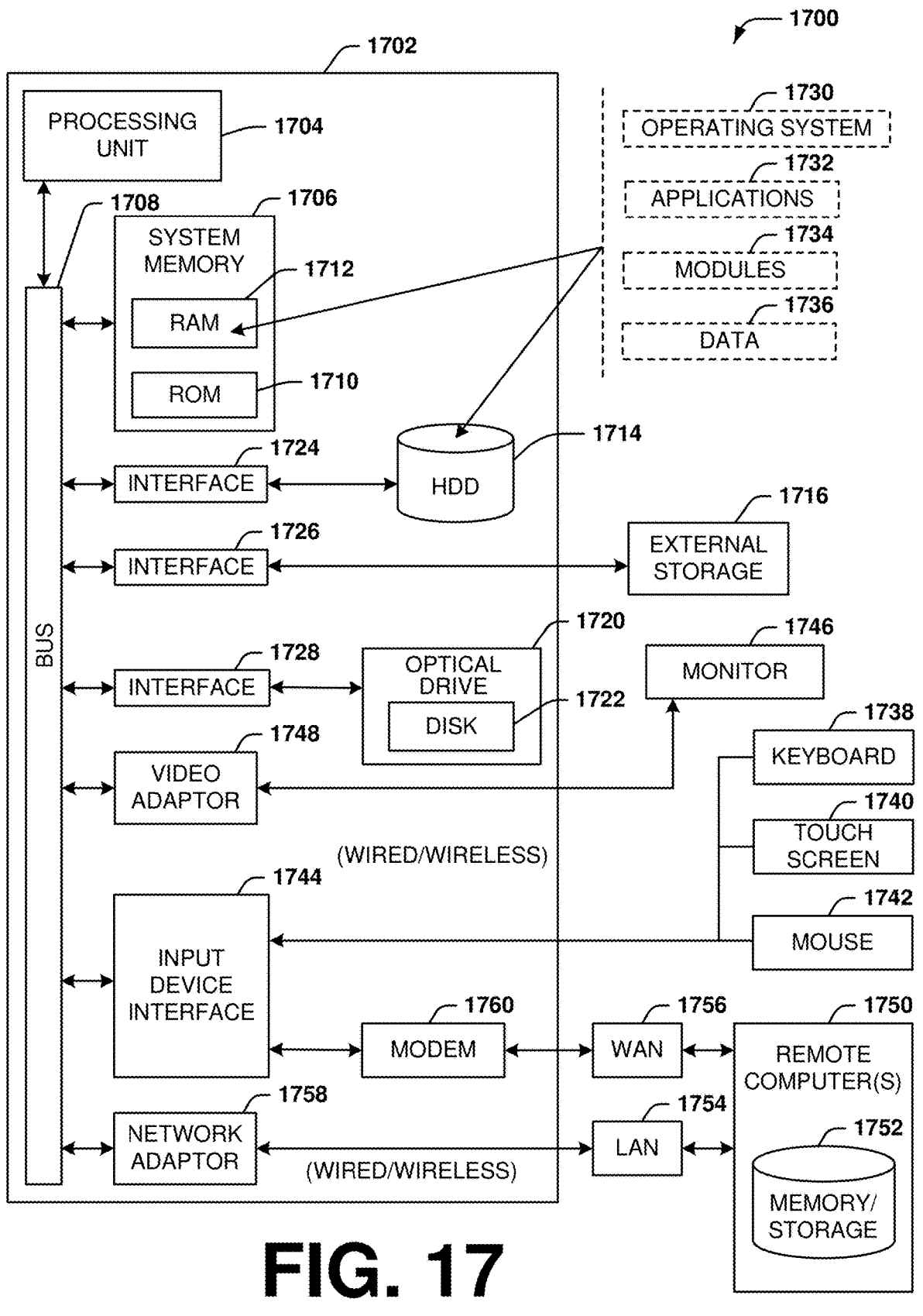
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a disc 1722, such as, for example, a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
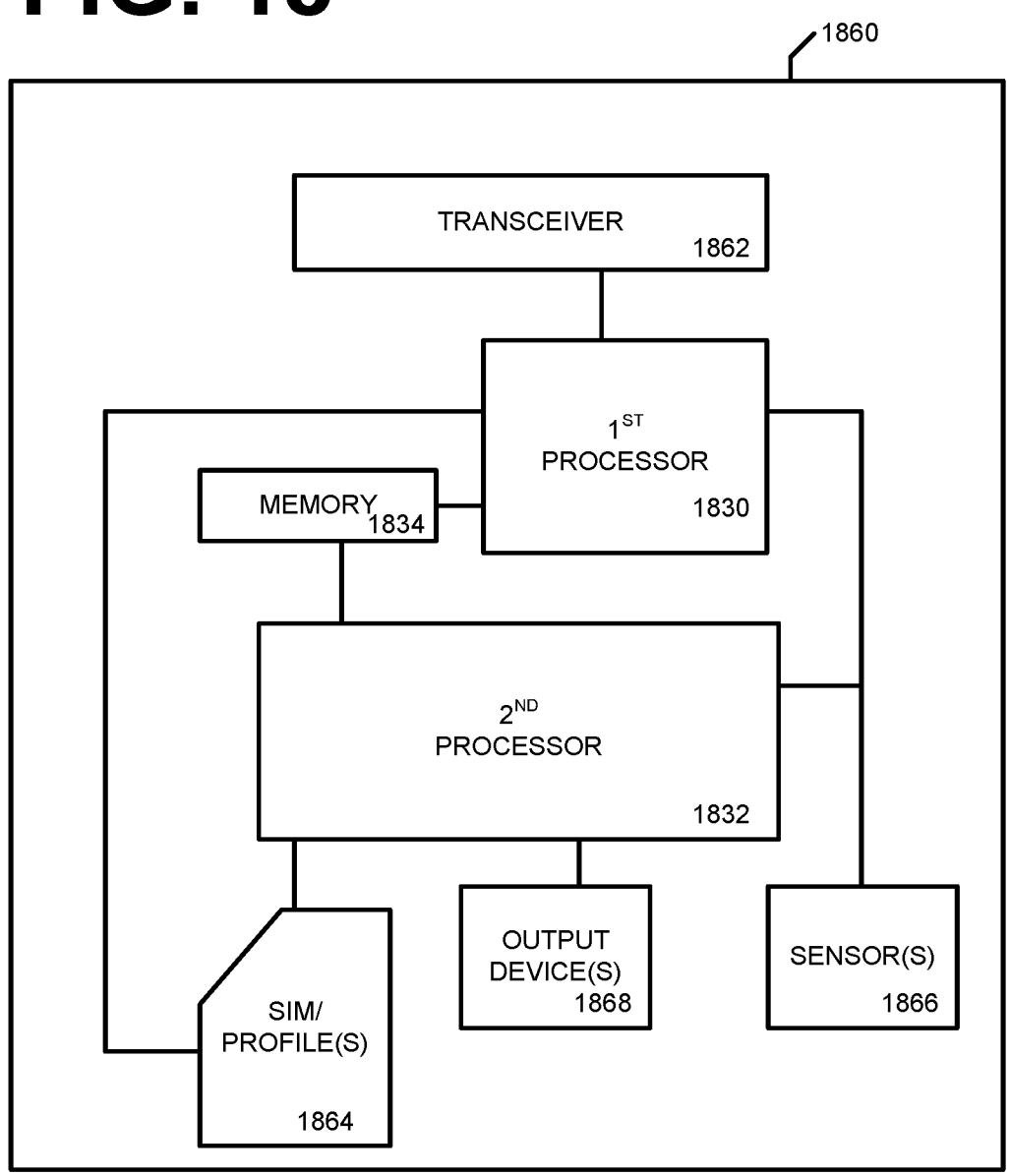
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |

TABLE 1-continued

| Term | Definition |
| --- | --- |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
facilitating, by a radio access network node comprising a processor, receiving traffic to be transmitted for reception by at least one user equipment;
determining, by the radio access network node, at least one resource usable by the radio access network node to transmit the traffic to result in at least one determined transmission resource, wherein the determining the at least one transmission resource excludes evaluation of channel condition information corresponding to the at least one user equipment, and wherein the determining of the at least one resource is based on receiving, from the user equipment during idle mode operation of the user equipment, at least one multicast-and-broadcast-services-specific preamble via an uplink beam that corresponds to a downlink beam that is not configured to deliver multicast-and-broadcast-services content; and
facilitating, by the radio access network node, transmitting a first portion of the traffic for reception by the at least one user equipment according to the at least one determined transmission resource.

2. The method of claim 1, wherein the at least one user equipment is configured to receive the first portion of the traffic during operation according to an idle mode.

3. The method of claim 1, further comprising:
facilitating, by the radio access network node, transmitting, to the at least one user equipment, a multicast configuration comprising at least one idle mode multicast beam pattern.

4. The method of claim 3, wherein the multicast configuration is transmitted to the at least one user equipment via a multicast-specific system information block message.

5. The method of claim 3, wherein the at least one determined transmission resource corresponds to the at least one idle mode multicast beam pattern.

6. The method of claim 3, wherein the at least one idle mode multicast beam pattern is a first idle mode multicast beam pattern, and wherein the traffic is associated with a target quality of service, the method further comprising:
facilitating, by the radio access network node, receiving, from the at least one user equipment, a channel condition message comprising a channel condition indication indicative that the at least one user equipment received the first portion of the traffic according to the at least one idle mode multicast beam pattern with an associated received quality of service that does not satisfy the target quality of service;
based on the channel condition indication, facilitating, by the radio access network node, determining a second idle mode multicast beam pattern of the at least one idle mode multicast beam pattern to result in a determined second idle mode multicast beam pattern; and
facilitating, by the radio access network node, transmitting a second portion of the traffic according to the determined second idle mode multicast beam pattern.

7. The method of claim 6, wherein the target quality of service is a target error rate, wherein the received quality of service is a received error rate corresponding to reception of the first portion of the traffic by the at least one user equipment, and wherein the received error rate is higher than the target error rate.

8. The method of claim 3, wherein the at least one idle mode multicast beam pattern is a first idle mode multicast beam pattern, wherein the multicast configuration further comprises a second idle mode multicast beam pattern of the at least one idle mode multicast beam pattern, wherein the multicast configuration further comprises a multicast beam pattern index associated with the second idle mode multicast beam pattern, and wherein the method further comprises:
facilitating, by the radio access network node, transmitting, to the at least one user equipment, a multicast beam pattern update message, comprising the multicast beam pattern index associated with the second idle mode multicast beam pattern, to indicate to the at least one user equipment to receive a second portion of the traffic according to the second idle mode multicast beam pattern, wherein the second idle mode multicast beam pattern comprises the downlink beam corresponding to the uplink beam via which the at least one multicast-and-broadcast-services-specific preamble is received.

9. The method of claim 8, wherein the multicast beam pattern update message is transmitted via a master information block message.

10. The method of claim 3, wherein the traffic is associated with a target quality of service, and wherein the multicast configuration further comprises the at least one multicast-and-broadcast-services-specific preamble, and wherein the receiving of the at least one multicast-and-broadcast-services-specific preamble is indicative to the radio access network node that that the at least one user equipment has received the first portion of the traffic according to the at least one idle mode multicast beam pattern with an associated received quality of service that does not satisfy the target quality of service.

11. The method of claim 10, further comprising:

based on at least one multicast-and-broadcast-services-specific preamble being received, determining, by the radio access network node, that the at least one user equipment has determined that the downlink beam, corresponding to the uplink beam via which the at least one multicast-and-broadcast-services-specific preamble is received, corresponds to a signal strength that is stronger, with respect to the at least one user equipment, than other signal strengths corresponding to other downlink beams corresponding to the radio access network node to result in a determined best downlink beam; and facilitating, by the radio access network node, transmitting, to the at least one user equipment, a paging message comprising a connected mode indication to indicate to the at least one user equipment to establish a connection with the radio access network node to receive the traffic in a connected mode.

12. The method of claim 10, wherein the at least one idle mode multicast beam pattern is a first idle mode multicast beam pattern, and wherein the method further comprises:

based on the at least one multicast-and-broadcast-services-specific preamble being received, determining, by the radio access network node, that the at least one user equipment has determined that the downlink beam corresponds to a signal strength that is stronger, with respect to the at least one user equipment, than other signal strengths corresponding to other downlink beams corresponding to the radio access network node to result in a determined best downlink beam;

determining, by the radio access network node, a second idle mode multicast beam pattern, of the at least one idle mode multicast beam pattern, that comprises the determined best downlink beam to result in a determined second idle mode multicast beam pattern;

facilitating, by the radio access network node, transmitting, to the at least one user equipment, a multicast beam pattern update message indicative to the at least one user equipment to receive the traffic according to the determined second idle mode multicast beam pattern; and facilitating, by the radio access network node, transmitting the traffic according to the determined second idle mode multicast beam pattern.

13. A radio access network node, comprising at least one processor, configured to process executable instructions that, when executed by the at least one processor, facilitate performance of operations, comprising:

receiving traffic to be transmitted for reception by at least one user equipment;

transmitting, to the at least one user equipment, a multicast configuration comprising downlink beam pattern information indicative of a first downlink beam of at least one downlink beam usable by the at least one user equipment to receive traffic corresponding to a multicast content session, wherein the traffic corresponding to the multicast content session is associated with a target quality of service;

based on receiving, from the user equipment during idle mode operation of the user equipment, at least one multicast-and-broadcast-services-specific preamble via an uplink beam that corresponds to a downlink beam, of the at least one downlink beam, that is not configured to deliver multicast-and-broadcast-services content, determining at least one resource usable by the radio access network node to transmit the traffic to result in at least one determined transmission resource;

transmitting a first portion of the traffic for reception by the at least one user equipment, during idle mode operation, according to the at least one determined transmission resource.

14. The radio access network node of claim 13, wherein the operations further comprise:

receiving, from the at least one user equipment, a channel condition message comprising a channel condition indication indicative that the at least one user equipment has received the first portion of the traffic corresponding to the multicast content session, via the first downlink beam of the at least one downlink beam, with a received quality of service that fails to satisfy the target quality of service;

based on the channel condition indication, determine a second downlink beam of the at least one downlink beam to result in a determined second downlink beam; and transmit a second portion of the traffic corresponding to the multicast content session according to the determined second downlink beam.

15. The radio access network node of claim 14, wherein the first downlink beam of the at least one downlink beam is associated with a first downlink beam pattern, wherein the multicast configuration further comprises a second downlink beam pattern, wherein the multicast configuration further comprises a multicast beam pattern index associated with the second downlink beam pattern, and wherein the operations further comprise:

transmitting, to the at least one user equipment, a multicast beam pattern update message comprising the multicast beam pattern index to indicate to the at least one user equipment to receive the second portion of the traffic corresponding to a multicast content session according to the second downlink beam pattern.

16. The radio access network node of claim 15, wherein the multicast configuration further comprises the at least one multicast-and-broadcast-services-specific preamble, and wherein the at least one multicast-and-broadcast-services-specific preamble is indicative to the radio access network node that the at least one user equipment has received the first portion of the traffic corresponding to the multicast content session according to the first downlink beam pattern with a received quality of service that does not satisfy the target quality of service.

17. The radio access network node of claim 15, wherein the operations further comprise:

determining that the at least one user equipment determined that the determined second downlink beam corresponds to a signal strength that is stronger, with respect to the at least one user equipment, than other signal strengths associated with other downlink beams corresponding to the radio access network node to result in a determined best downlink beam;

determining an idle mode multicast beam pattern that comprises the determined best downlink beam to result in a determined idle mode multicast beam pattern; and transmitting, to the at least one user equipment, a multicast beam pattern update message indicative to the at least one user equipment to receive the traffic corresponding to the multicast content session according to the determined idle mode multicast beam pattern, wherein the determined idle mode multicast beam pattern comprises the determined second downlink beam.

18. A non-transitory machine-readable medium, comprising executable instructions that, when executed by a processor of a radio access network node, facilitate performance of operations, comprising:

receiving traffic to be transmitted for reception by at least one user equipment;

transmitting, to the at least one user equipment, a multicast configuration comprising downlink beam pattern information indicative of a first downlink beam of at least one downlink beam usable by the at least one user equipment to receive traffic corresponding to a multicast content session, wherein the traffic corresponding to the multicast content session is associated with a target quality of service;

based on receiving, from the at least one user equipment during idle mode operation of the user equipment, at least one multicast-and-broadcast-services-specific preamble via an uplink beam that corresponds to a downlink beam, of the at least one downlink beam, that is not configured to deliver multicast-and-broadcast-services content, determining at least one resource usable by the radio access network node to transmit the traffic to result in at least one determined transmission resource; and transmitting a first portion of the traffic for reception by the at least one user equipment during idle mode operation according to the at least one determined transmission resource.

19. The non-transitory machine-readable medium of claim 18, wherein the operations further comprise:

receiving, from the at least one idle user equipment, a channel condition message comprising a channel condition indication indicative that the at least one user equipment has received the first portion of the traffic corresponding to the multicast content according to the determined first beam pattern with a received quality of service that does not satisfy the target quality of service;

based on the channel condition indication, determining to transmit to the at least one user equipment during idle mode operation of the user equipment the traffic corresponding to the multicast content according to an updated resource; and transmitting, to the at least one user equipment during idle mode operation, a second portion of the traffic corresponding to the multicast content according to the updated resource.

20. The non-transitory machine-readable medium of claim 18, wherein the operations further comprise:

establishing, with the at least one user equipment during idle mode operation of the user equipment, a communication session to result in the at least one idle user equipment being a connected user equipment;

scheduling the updated resource to be usable by the at least one user equipment to receive the second portion of the traffic corresponding to the multicast content to result in a scheduled resource; and transmitting, to the connected user equipment, a scheduling message indicating the scheduled resource.

* * * * *